United States Patent
Yang et al.

(10) Patent No.: US 9,190,026 B2
(45) Date of Patent: Nov. 17, 2015

(54) SYSTEMS AND METHODS FOR FEATURE FUSION

(71) Applicant: CANON KABUSHIKI KAISHA, Tokyo (JP)

(72) Inventors: Yang Yang, Winter Springs, FL (US); Bradley Scott Denney, Irvine, CA (US); Juwei Lu, Irvine, CA (US); Dariusz Dusberger, Irvine, CA (US); Hung Khei Huang, Irvine, CA (US)

(73) Assignee: Canon Kabushiki Kaisha, Tokyo (JP)

(*) Notice: Subject to any disclaimer, the term of this patent is extended or adjusted under 35 U.S.C. 154(b) by 245 days.

(21) Appl. No.: 13/829,338

(22) Filed: Mar. 14, 2013

(65) Prior Publication Data
US 2014/0267301 A1    Sep. 18, 2014

(51) Int. Cl.
G06T 11/00 (2006.01)
G09G 5/24 (2006.01)
G06T 11/20 (2006.01)
G06K 9/62 (2006.01)

(52) U.S. Cl.
CPC ............... G09G 5/24 (2013.01); G06K 9/6219 (2013.01); G06T 11/206 (2013.01)

(58) Field of Classification Search
None
See application file for complete search history.

(56) References Cited

U.S. PATENT DOCUMENTS

| | | | |
|---|---|---|---|
| 7,961,957 B2 | 6/2011 | Schclar | |
| 2009/0083010 A1* | 3/2009 | Qi et al. | 703/2 |
| 2013/0325759 A1* | 12/2013 | Rachevsky et al. | 706/12 |

OTHER PUBLICATIONS

G. J. Burghouts et al., Performance evaluation of local colour invariants, Computer Vision and Image Understanding, 113:48-62, 2009.
D.G. Lowe, Distinctive image features from scale-invariant keypoints, Int. J.Comput. vision60(2), 91-110 (2004).
R.R. Coifman et al., Diffusion maps, Applied and Computational Harmonic Analysis, 21:5-30, 2006.
S. Lafon et al., Diffusion maps and coarse-graining: a unified framework for dimensionality reduction, graph partitioning, and data set parameterization, PAMI, pp. 1-17, 2006.
Q.V. Le et al., Learning Hierarchical spatio-temporal Features for Action Recognition with Independent Subspace Analysis, CVPR 2011, pp. 3361-3368.
R. Fergus et al., Semi-supervised Learning in Gigantic Image Collections, Advances in Neural Information Processing Systems, pp. 1-9 (2009).
J. Vogel et al., Natural scene retrieval based on a semantic modeling step, CIVR 2004.
L. Yang et al, Unifying discriminative visual codebook generation with classifier training for object category recognition, CVPR 2008.

(Continued)

*Primary Examiner* — Phi Hoang
*Assistant Examiner* — Mohammad H Akhavannik
(74) *Attorney, Agent, or Firm* — Canon U.S.A., Inc. IP Division

(57) ABSTRACT

Systems and methods for generating visual words define initial inter-visual word relationships between a plurality of visual words; define visual word-image relationships between the plurality of visual words and a plurality of images; define inter-image relationships between the plurality of images; generate revised inter-visual word relationships in a vector space based on the initial inter-visual word relationships, the inter-image relationships, and the visual word-image relationships; and generate higher-level visual words in the vector space based on the revised inter-visual word relationships.

19 Claims, 21 Drawing Sheets

(56) References Cited

OTHER PUBLICATIONS

B. Fulkerson et al, Localizing objects with smart dictionaries, ECCV 2008, pp. 179-192.
W. H. Hsu et al., Visual cue cluster construction via information bottleneck principle and kernel density estimation, CIVR 2005.
J. Winn et al, Object categorization by learned universal visual dictionary, ICCV 2005, pp. 1-8.
A. Bosch et al, Scene classification via pLSA, ECCV 2006.
L. Fei-Fei et al., A Bayesian hierarchical model for learning natural scene categories, CVPR 2005, pp. 1-8.
Laurens van der Maaten et al., Visualizing Non-Metric Similarities in Multiple Maps, Machine Learning, 2011, pp. 1-23.
Jiawei Han, Mining Heterogeneous Information Networks: The Next Frontier, University of Illinois at Urbana-Champaign, Aug. 2012, pp. 1-60.
Stéphane Lafon et al., Data Fusion and Multi-Cue Data Matching by Diffusion Maps, IEEE Trans. Pattern Anal. Mach. Intell., vol. 28 (2006), pp. 1784-1797.
Jingen Liu et al., Learning Semantic Features for Action Recognition via Diffusion Map, Computer Vision and Image Understanding, vol. 116, Issue 3, Mar. 2012.
Jingen Liu et al., Learning Semantic Visual Vocabularies Using Diffusion Distance, IEEE International Conference on Computer Vision and Pattern Recognition(CVPR), Miami, 2009.
Jingen Liu et al., Learning Semantic Vocabularies using Diffusion Distance Project page, downloaded from http://www.cs.ucf.edu/~liujg/dm.html, Oct. 11, 2012.
Boaz Nadler et al., Diffusion Maps—a Probabilistic Interpretation for Spectral Embedding and Clustering Algorithms, Lecture Notes in Computational Science and Engineering 2007, vol. 58, pp. 238-260.
Boaz Nadler et al., Diffusion Maps, Spectral Clustering and Eigenfunctions of Fokker-Planck Operators, Advances in Neural Information Processing Systems, No. 18, pp. 955-962, 2005.
Boaz Nadler et al., Diffusion Maps, Spectral Clustering and Reaction Coordinates of Dynamical Systems, Appl. Comput. Harmon. Anal. 21 (2006) 113-127.
Oana Sidi et al., Unsupervised co-segmentation of a set of shapes via descriptor-space spectral clustering, ACM Transactions on Graphics (TOG), vol. 30 Issue 6, Dec. 2011.
Andreas Opelt et al., "Generic Object Recognition with Boosting", PAMI, 2004.
Andreas Opelt et al., "Fusing Shape and Appearance Information for Object Category Detection", BMVC, 2006.
W. Zhang et al., "Object Class Recognition Using Multiple Layer Boosting with Heterogeneous Features", CVPR, 2005.

\* cited by examiner

SYSTEMS AND METHODS FOR FEATURE FUSION

BACKGROUND

1. Field

The present disclosure generally relates to forming relationships between image features.

2. Background

Various methods exist for extracting features from images. Examples of feature detection algorithms include scale-invariant feature transform ("SIFT"), difference of Gaussians, maximally stable extremal regions histogram of oriented gradients, gradient location and orientation histogram, smallest univalue segment assimilating nucleus, and speeded-up robust features. Also, multiple features are sometimes used to recognize objects in images. Additionally, an image may be associated with one or more labels, for example tags that are applied by a user.

SUMMARY

In one embodiment, a method comprises defining initial inter-visual word relationships between a plurality of visual words; defining visual word-image relationships between the plurality of visual words and a plurality of images; defining inter-image relationships between the plurality of images; generating revised inter-visual word relationships in a vector space based on the initial inter-visual word relationships, the inter-image relationships, and the visual word-image relationships; and generating higher-level visual words in the vector space based on the revised inter-visual word relationships.

In one embodiment, a device for mapping feature relationships to a vector space comprises one or more computer-readable media configured to store features and comprises one or more processors that are coupled to the memory and that are configured to cause the device to generate initial inter-feature relationships for a plurality of features, generate feature-image relationships between the plurality of features and a plurality of images, and map the features to a vector space based on the initial inter-feature relationships and the feature-image relationships.

In one embodiment, one or more computer-readable media store instructions that, when executed by one or more computing devices, cause the one or more computing devices to perform operations comprising defining inter-feature relationships between a plurality of features of a first type and a plurality of features of a second type, wherein the inter-features relationships are based on feature-object relationships between the plurality of features of the first type and intermediate objects and on feature-object relationships between the plurality of features of the second type and the intermediate objects; defining intra-feature relationships between the features of the first plurality of features; defining intra-feature relationships between the features of the second plurality of features; and mapping the features of the first plurality of features and the features of the second plurality of features to a vector space based on the inter-feature relationships and the intra-feature relationships.

In one embodiment, a method comprises defining initial inter-visual word relationships between a plurality of visual words; defining semantic label-visual word relationships between a plurality of semantic labels and the plurality of visual words; defining inter-semantic label relationships between the plurality of semantic labels; generating revised inter-visual word relationships in a vector space based on the initial inter-visual word relationships, the semantic label-visual word relationships, and the inter-semantic label relationships; and generating higher-level visual words in the vector space based on the revised inter-visual word relationships.

DESCRIPTION

The following disclosure describes certain explanatory embodiments. Additionally, the explanatory embodiments may include several novel features, and a particular feature may not be essential to practice the systems and methods described herein.

Figure 1:
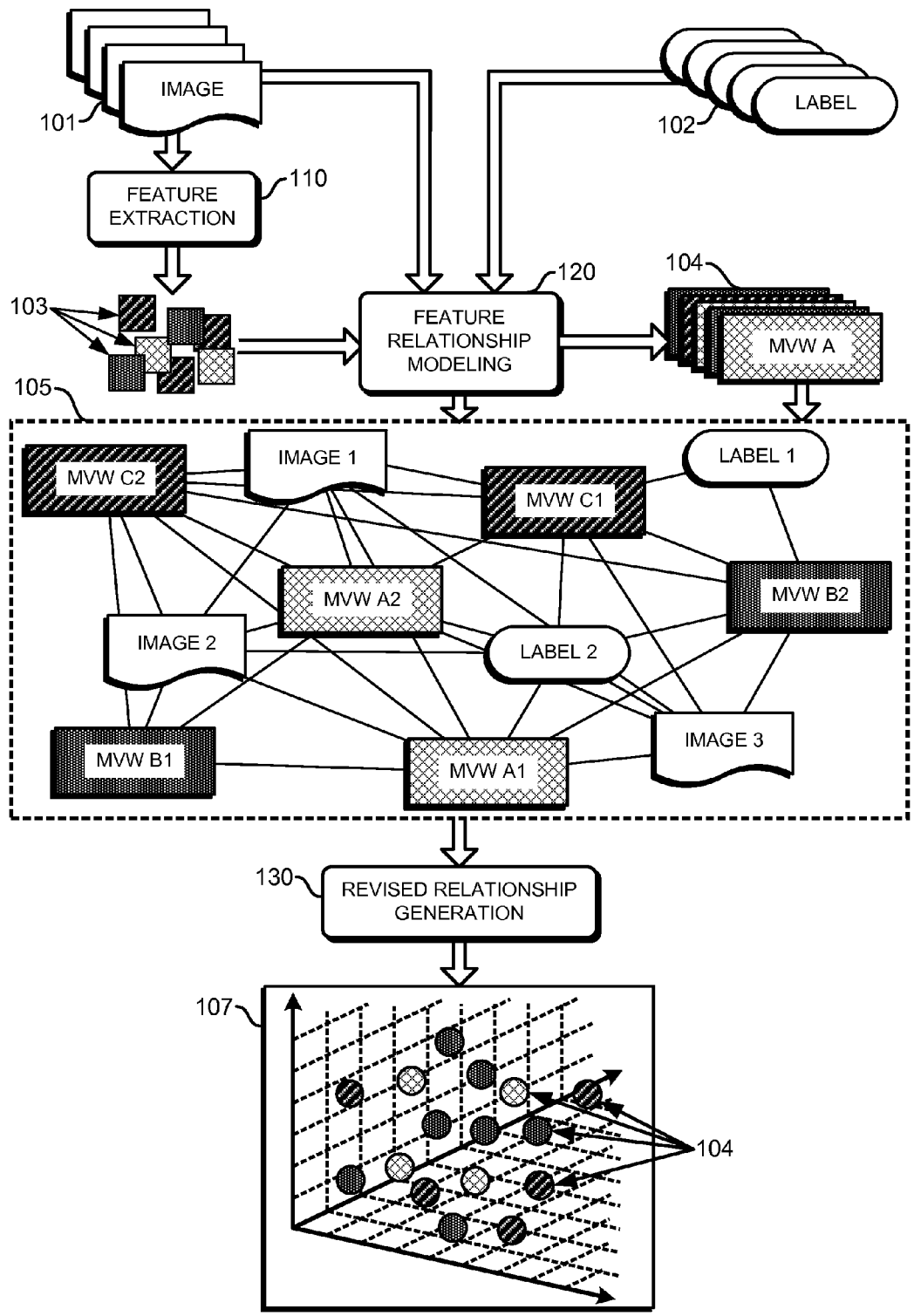
FIG. 1 illustrates an example embodiment of the flow of operations in a feature fusion system.

FIG. 1 is a block diagram that illustrates an example embodiment of the flow of operations in a feature fusion system. The system includes one or more computing devices (e.g., desktops, laptops, tablets, servers, phones, PDAs), although only certain computing-device components are shown in FIG. 1 in order to emphasize the operations. The system includes a feature-extraction module 110, which receives one or more images 101 (e.g., labeled training images) and extracts low-level features 103 from the one or more images 101. Modules include logic, computer-readable data, or computer-executable instructions, and may be implemented in one or more of software (e.g., Assembly, C, C++, C#, Java, BASIC, Perl, Visual Basic), firmware, and hardware. In some embodiments, the system includes additional or fewer modules, the modules are combined into fewer modules, or the modules are divided into more modules. Though the computing device or computing devices that execute a module actually perform the operations, for purposes of description a module may be described as performing one or more operations.

The low-level features 103, the images 101, and, in some embodiments, any labels 102 (zero or more labels) that are associated with respective ones of the images 101, are input to a feature-relationship-modeling module 120. The feature-relationship-modeling module 120 generates mid-level visual words 104 (a mid-level visual word is also referred to herein as an "MVW") based on the low-level features 103. Additionally, the feature-relationship-modeling module 120 generates one or more representations (e.g., a graph, a co-occurrence matrix, a weight matrix, an affinity matrix) of the relationships of the MVWs 104 and, in some embodiments, the images 101 or the labels 102. Also, in some embodiments the feature-relationship-modeling module 120 generates a representation of the relationships of one or more of the low-level features 103, the images 101, and the labels 102.

In the embodiment shown, the representation of the relationships is a graph 105 (e.g., a co-occurrence graph) that defines relationships between the images 101, the MVWs 104, and the labels 102. For example, the edge values of the graph 105 represent the relationships between the nodes, which are images, labels, and MVWs in the illustrated graph 105. The representation of the relationships (e.g., the graph 105) is then obtained by the revised-relationship-generation module 130, which maps the representation of the relationships to a vector space 107 and generates revised relationships in the vector space 107 based on the relationships in the representation of the relationships (e.g., the graph 105). In some embodiments, the revised relationships in the vector space 107 represent the relationships between the MVWs as distances in a Euclidian space. Also, groups of MVWs in the vector space 107 may be used to fuse the MVWs to generate high-level visual words (a high-level visual word is also referred to herein as an "HVW").

The system may take advantage of the likely correlation of low-level features or MVWs that are from the same source. For example, the low-level features and MVWs in a human eye frequently co-occur with the low-level features and MVWs in a human nose, because the eye and nose frequently appear together in images of human faces. However, low-level-feature detection may not be accurate enough because the low-level-feature representations may include noise. For example, the eye's low-level features may be detected as being features from a "leaf", and a leaf is not very related to a human face. To fuse multiple types of low-level features, the system learns the low-level-feature co-occurrence information or the MVW co-occurrence information and uses the information to fuse different types of low-level features or MVWs, for example to create HVWs. Thus, the system may be able to reduce the noise of the original low-level features, reduce the noise in the MVWs, reduce the dimensionality of the resulting fused features, and generate a more compact and powerful image representation.

Embodiments of the system model the relationships between different types of low-level features or MVWs. This may include determining the correlation between MVWs based on their co-occurrence. The MVWs that are highly correlated with each other may be merged into a high-level feature, for example if the "eye" MVWs almost always co-occur with the "nose" MVWs, then both of these types of MVWs can be considered "facial" MVWs.

For example, some embodiments of the system extract the color SIFT and ISA low-level features (color SIFT and ISA are types of low-level features) from a set of images and designates these features as low-level features. Mid-level visual words are generated from the low-level features, and the embodiments build a bag-of-words representation of each image and generate an MVW-relationship model (e.g., a co-occurrence graph, a co-occurrence matrix) that represents the MVW relationships based on the co-occurrences of the MVWs in the images. For example, in some embodiments the edges in a graph encode the co-occurrence relationships between each node (e.g., MVWs, images). Some of the embodiments of the system perform a Markov random walk and use diffusion maps to embed (or otherwise map) the MVWs (and, in some embodiments, the images) into a vector space (e.g., a coordinate space, a lower-dimensional vector space). The neighboring MVWs, which are represented as points in the vector space, correspond to highly-related MVWs, and groups of MVWs may be used to define the high-level visual words.

Figure 2:
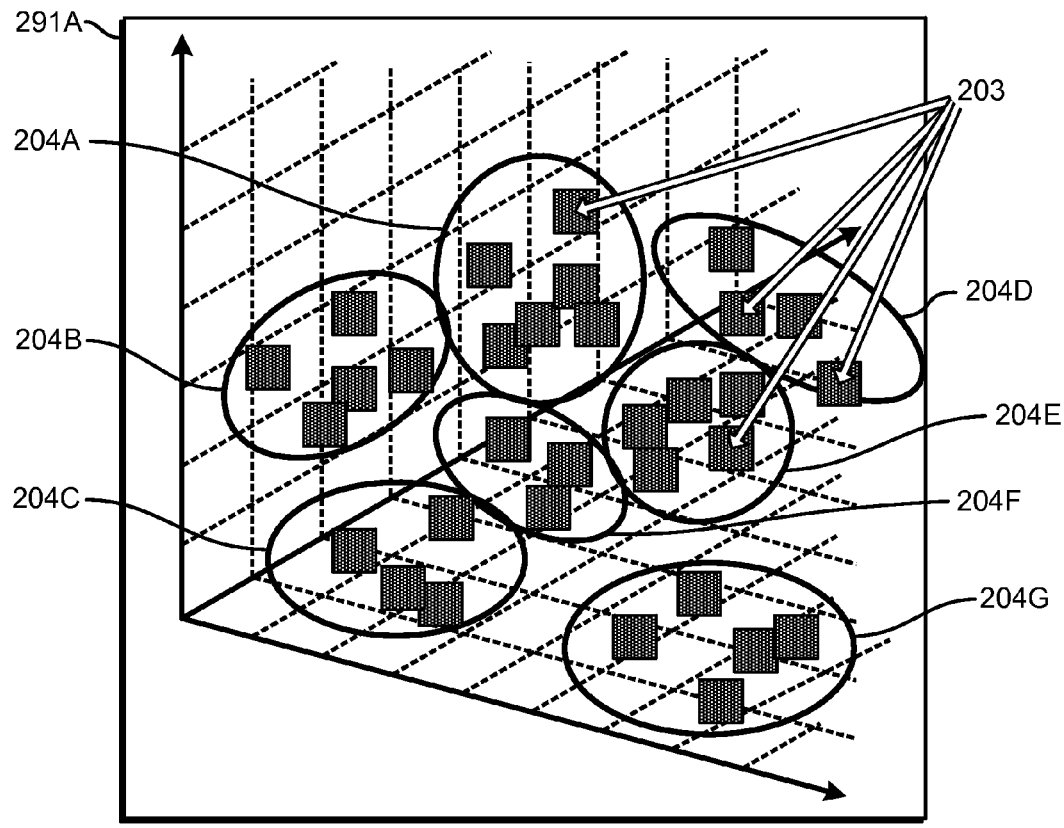
FIG. 2 illustrates the generation of mid-level visual words from low-level features.
Figure 2:
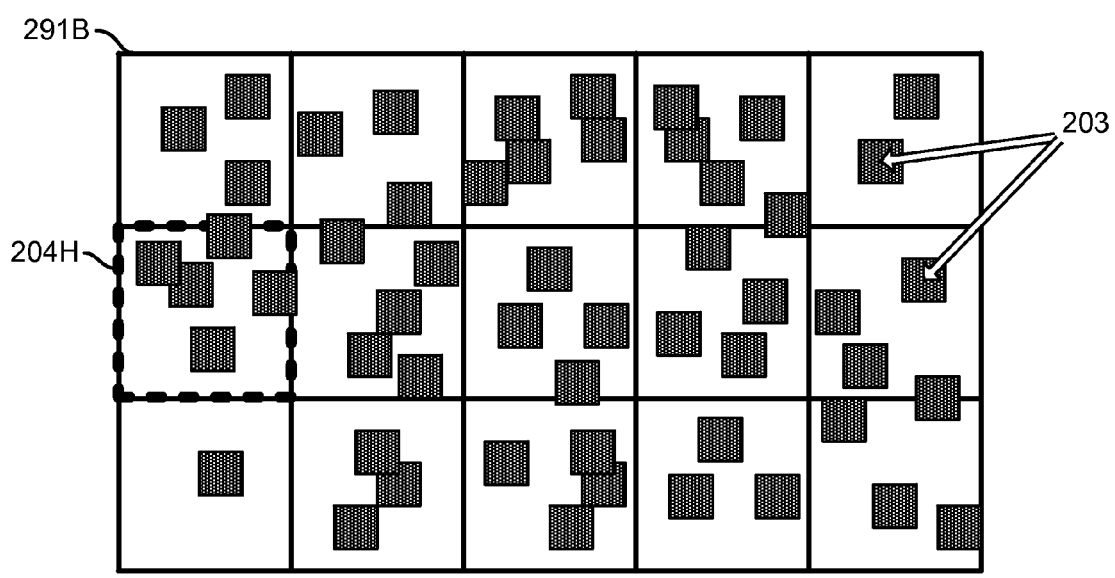

FIG. 2 illustrates the generation of mid-level visual words 204 from low-level features 203. In a first example 291A, the low-level features 203 are clustered (e.g., a 128 dimensional space for SIFT features), for example via k-means clustering, and the MVWs 204 are formed from the clusters (e.g., one or more clusters are designated as a certain MVW). In a second example 291B, the native space of the low-level features is partitioned into a grid (e.g., a two-dimensional grid (as shown in FIG. 2), a three-dimensional grid, a forty-five-dimensional grid, etc.), a defined space in the grid is designated to be an MVW, and the low-level features are mapped to the MVWs in the grid.

Figure 3:
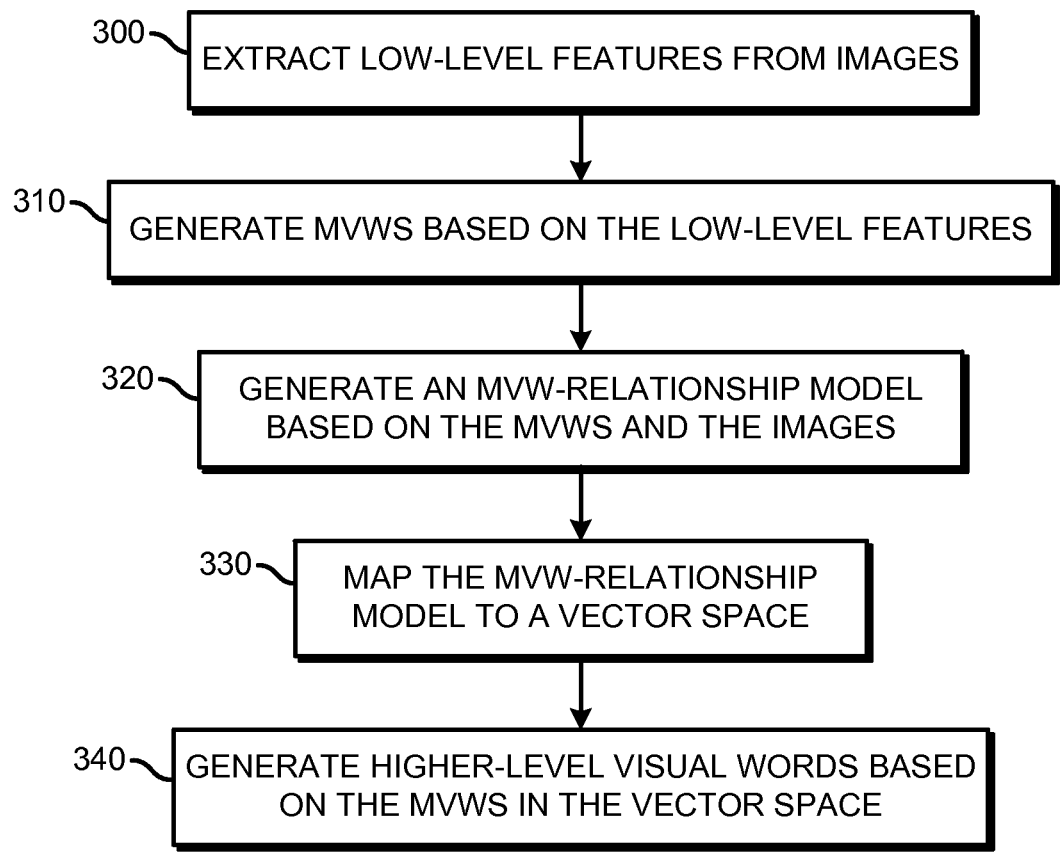
FIG. 3 illustrates an example embodiment of a method for feature fusion.

FIG. 3 illustrates an example embodiment of a method for feature fusion. The blocks of the method may be performed by one or more computing devices, for example the systems and devices described herein. Also, other embodiments of this method and the other methods described herein may omit blocks, add blocks, change the order of the blocks, combine blocks, or divide blocks into more blocks.

The flow starts in block 300, where low-level features are extracted from images. For example, ISA features and SIFT features may be extracted. An ISA feature is feature that is generated by unsupervised learning using an independent subspace analysis ("ISA") algorithm. The ISA algorithm implements a nonlinear unsupervised-learning method, which means the output of each component is not a simple inner product of the input vector and the weight vector. In ISA, a given number of subspaces are defined before learning the components. The components inside each subspace do not need to be independent, and the energies of the subspaces, one of which is computed by taking the square root of the sum of energy of all the components in the subspace, are maximized to achieve the independence of different subspaces. The ISA algorithm learns a set of filters from random patches in a training set, and the filter responses are the ISA features. The ISA process begins by extracting random sub-patches from unlabeled input images. Each patch is stretched into a vector in $\mathbb{R}^N$. The training data X is constructed by concatenating C randomly sampled patches, $x^{(1)}, \ldots, x^{(c)}$, where $x^{(i)} \in \mathbb{R}^N$.

Given this N×C matrix X, the ISA filters are learned by minimizing the following equation:

$$\text{argmax}_F \sum_{i=1}^{C} \sum_{j=1}^{P} \sqrt{\sum_{k=1}^{s} (f^{(j)(k)} x'^{(i)})^2}, \text{ subject to } FF^T = I, \quad (1)$$

where $f^{(j)(k)}$ is the $k^{th}$ component in the $j^{th}$ subspace, and F is the matrix where the $j^{th}$ column is the concatenation of the s components of the $j^{th}$ subspace. This ensures that the subspaces are orthogonal to each other and, hence, independent. The sum-square and square-root operations introduce non-linearity into the algorithm and make the algorithm more flexible and capable of learning more complex structures. The dependence of components within each subspace leads to invariance inside each subspace and makes the learned filters more robust to small variation.

A SIFT descriptor characterizes local edge distribution around key points. Extension to color allows characterization of color gradients, rather than only intensity gradients. In color SIFT, the first vector of 128 bytes in the descriptor carries the intensity-related information, whereas the second and third vectors contain the orthogonal chromatic information. Hence, intensity, shadow, and shading effects are present in the intensity vector, whereas the pure chromatic information is carried by the additional color vectors.

Next, in block 310, MVWs are generated based on the low-level features, for example via clustering. After block 310, the flow proceeds to block 320, where an MVW-relationship model is generated based on the MVWs and the images. Some embodiments generate a relationship graph or a relationship matrix. For example, some embodiments apply vector quantization to each type of low-level feature separately to generate the MVW codebook for each type of low-level feature. The codebook sizes (e.g., number of MVWs) of ISA and color-SIFT low-level features are denoted by $N_{isa}$ and $N_{c-SIFT}$, respectively. Then an MVW-Image co-occurrence matrix S (an $N_{isa}+N_{c-SIFT}$ by $N_{image}$ matrix) is constructed, for example by counting the frequencies of the low-level features of each MVW in each image. The relationship between different MVWs may be found based on their co-occurrence. Some embodiments weight S by using term frequency-inverted document frequency ("tf-idf") to obtain a weighted co-occurrence matrix S', and build a graph G (e.g., graph 105 in FIG. 1) containing multiple entities as nodes. The entities include different types of MVWs—which correspond to different types of low-level features (e.g., ISA features, color-SIFT features)—and images. The edges of the graph G can be written as a weight matrix W, and the weight matrix W may be calculated from the nodes in the graph G, which, in this example, are the MVWs and the images. Therefore, W has the following block structure:

$$\begin{pmatrix} II & AI^T & SI^T \\ AI & AA & AS^T \\ SI & AS & SS \end{pmatrix},$$

where II, AA, SS, AI, SI, and AS, respectively, denote the block matrix of Image-Image, ISA-ISA, SIFT-SIFT, Image-ISA, Image-SIFT, and ISA-SIFT similarities. The Image-MVW similarity blocks of the weight matrix W are computed directly from the corresponding value of the weighted co-occurrence matrix S'. The Image-Image and MVW-MVW similarity blocks are computed by using the inner product of the rows of the weighted co-occurrence matrix S'.

After block 320, flow proceeds to block 330, where the MVW-relationship model is mapped to a vector space. In some embodiments, the weight matrix W, which is symmetric and positive, is obtained, and the pairwise similarities are interpreted as edge flows in a Markov random walk on the graph. In these embodiments, the similarity is analogous to the transition probability on the edge. Then, utilizing the spectral analysis of a transition matrix P (e.g., a Markov transition matrix) that is generated based on the weight matrix W, the d-dominant eigenvectors are used as the coordinates of the embedding vector space, and the MVWs are projected onto that embedded vector space while preserving their local geometric relationships (e.g., distances, such as Euclidean distances). In this embedded vector space, the Euclidean distance between two MVWs preserves their diffusion distance in the original space. The diffusion map embedding is further described below.

Given the weight matrix W, a Gaussian kernel can be used to make the weight matrix W positive and symmetric. The weight matrix W can then be normalized, and it can represent the first-order Markov transition matrix of the feature graph. A Markov random walk on the graph G (or other relationship representation) can then be defined. If two nodes are closer (e.g., more similar), they are more likely to transmit to each other in a Markov random walk. The normalized edge weight can be treated as the transition probability between two nodes, and consequently, a transition matrix $P=P^{(1)}=\{p_{ij}^{(1)}\}$ (e.g., a Markov transition matrix) is constructed by normalizing the weight matrix W such that its rows add up to 1:

$$p_{ij} = w_{ij} \bigg/ \sum_k w_{ik}. \quad (2)$$

The transition matrix P can be considered to be the transition kernel of the Markov chain on the graph G, which governs the evolution of the chain on the space. In other words, $p_{ij}^{(1)}$ defines the transition probability from node i to j in a single transition step, and the transition matrix P defines the entire Markov chain. $P^{(1)}$ indicates the first-order neighborhood geometry of the data. The random walk may be run forward in time to capture information about larger neighborhoods by taking powers of the transition matrix P. The transition matrix at t number of transition steps, $P^{(t)}$, is given by $P^{(1)t}$. The number of transition steps t could be any real number (e.g., 1, 2, 3, 3.75). The entries in the transition matrix $P^{(t)}$ at t number of time steps represent the probability of going from i to j in t transition steps. Also, in some embodiments the diagonal of the transition matrix P is 0, which constrains the transition matrix P to be a forward-probability matrix by not allowing a path from a node to itself in a single transition step.

In some embodiments, a cluster is a region in which the probability of the Markov chain escaping the region is low. The higher the value of the number of transition steps t, the higher the likelihood of diffusing to further away points. The transition matrix P thus reflects the intrinsic structure of the data set, defined via the connectivity of the graph G, in a diffusion process, and the diffusion steps (e.g., the number of transition steps t) play the role of a scale parameter in the data analysis. Generally, fewer diffusion steps means higher data resolution, or finer representation, and vice versa.

The diffusion distance D between two nodes (e.g., MVWs, low-level features, labels, images) on the graph G can be defined using the random-walk forward probabilities $p_{ij}^{(t)}$ to relate the spectral properties of a Markov chain (e.g., its transition matrix, eigenvalues, and eigenvectors) to the underlying structure of the data (e.g., the nodes in the graph G and their relationships). The diffusion distance D measures the similarity between two data points, $z_i$ and $z_j$, by comparing the likelihoods that a Markov chain transits from each of them to the same node $z_q$ by following any arbitrary path that has a length of t number of transition steps. The diffusion distance D between two such data points can be calculated according to $$[D^{(t)}(z_i, z_j)]^2 = \sum_{q \in Z} \frac{(p_{iq}^{(t)} - p_{jq}^{(t)})^2}{\varphi(z_q)^{(0)}}, \qquad (3)$$

where $\phi(z_q)^{(0)}$ is the stationary distribution that measures the density of the MVWs (or other nodes). It is defined by $\phi(z_q)^{(0)} = d_q / \Sigma_j d_j$, where $d_q$ is the degree of node $z_q$, defined by $d_q = \Sigma_j p_{qj}$. A pair of MVWs with a high forward-transition probability has a small diffusion distance D. In other words, the diffusion distance D will be small between two MVWs if the MVWs are connected by many t-length paths in the graph. This notion of proximity of MVWs in the graph G reflects the intrinsic structure of the nodes in terms of connectivity of the MVWs in a diffusion process. Because the diffusion distance D may be computed using all (or nearly all) possible paths through the graph, compared to the shortest path method (e.g., the geodesic distance), the diffusion distance D may take into account all of or nearly all of the evidence relating $z_i$ to $z_j$ and therefore may be more robust to noise.

The Eigen decomposition of the transition matrix P is shown below in equation (4). Each row of matrix $\{\phi_i(z_j)\}$ corresponds to a right eigenvector of the transition matrix P. All the eigenvectors are orthonormal to each other, and the eigenvectors form a basis on the vector space, where the projection (e.g., coordinate) of a feature $z_j$ on the eigenvector $\phi_i$ is $\phi_i(z_j)$. Hence, the $j^{th}$ column of matrix $\{\phi_i(z_j)\}$ is the projection of the data point $z_j$. Due to the decay of eigenvalues, d eigenvectors corresponding to the d largest eigenvalues can be selected to construct a lower-dimensional vector space, which captures most of the information in the original higher-dimensional vector space. Following is equation (4):

$$P = \begin{bmatrix} \varphi_1(z_1) & \varphi_1(z_2) & \cdots & \varphi_1(z_m) \\ \varphi_2(z_1) & \varphi_2(z_2) & & \varphi_2(z_m) \\ \vdots & \vdots & \vdots & \vdots \\ \varphi_d(z_1) & \varphi_d(z_2) & & \varphi_d(z_m) \\ \vdots & \vdots & \vdots & \vdots \\ \varphi_m(z_1) & \varphi_m(z_2) & \cdots & \varphi_m(z_m) \end{bmatrix} \begin{bmatrix} \lambda_1 & & & 0 \\ & \lambda_2 & & \\ & & \ddots & \\ 0 & & & \lambda_m \end{bmatrix} \begin{bmatrix} \Phi_1^T \\ \Phi_2^T \\ \vdots \\ \Phi_m^T \end{bmatrix}. \qquad (4)$$

Furthermore, by calculating the eigenvalues and eigenvectors of the transition matrix P, the nodes can be embedded into a d-dimensional vector space by choosing the first d eigenvectors and eigenvalues. In that space, the diffusion distance D is approximated by, or is equal to, the Euclidian distance. The diffusion distance D in the d-dimensional vector space can be approximated according to equation (5):

$$[D^{(t)}(z_i, z_j)]^2 \approx \sum_{s=2}^{d+1} (\lambda_s^t)^2 (\varphi_s(z_i) - \varphi_s(z_j))^2. \qquad (5)$$

Finally, after block 330, the flow proceeds to block 340, where higher-level visual words are generated based on the MVWs in the vector space. In some embodiments, once the nodes in the graph (e.g., the MVWs, the images, the labels, the low-level features) have been embedded into the vector space, the MVWs (or the low-level features) are clustered, for example by applying a k-means algorithm in the vector space to cluster the MVWs into K groups, each of which may be a high-level fused feature, and a high-level fused feature may be used as a high-level visual word. The clustering results of k-means may build a mapping between the MVWs and the high-level visual words or between the low-level features and the high-level visual words. Afterwards, the bag-of-words model may be converted to the bag-of-high-level-words model.

In some embodiments, the weight matrix W is huge. Thus, Eigen-decomposition on the weight matrix W may be very difficult. Therefore, some embodiments use one or more of the following techniques or properties to facilitate the Eigen-decomposition: k-nearest-neighbors may be used to define the weight matrix W; hence each row of the weight matrix W has only K non-zero values and the weight matrix W is a sparse matrix. The eigen-decomposition can then be solved, for example using an SVD function in MATLAB.

Additionally, the k-nearest-neighbors for each data object are not symmetrical. For example, if A is a k-nearest-neighbor of B then B is not necessarily a k-nearest-neighbor of A. However, the weight matrix W can be constructed using connections to an object A that include the objects that have object A in their k-nearest-neighbor set and the k-nearest-neighbors of object A. In these embodiments, each row and column will have K or more non-zero entries with no more than 2K non-zero entries. Thus, sparse eigenvalue decomposition techniques may be used.

Also, instead of directly computing the eigenvalues and eigenvectors of the weight matrix W, an eigenfunction may be used. These eigenfunctions may be well-approximated based on the assumption that the dimensions of the feature vectors are approximately independent.

Furthermore, the weight matrix W may become huge because of the large number of images in the relationship representation (e.g., graph G). Instead of using each image as a node in the relationship representation, the images may first be pre-clustered into image groups, and then the image groups can be embedded into the graph G to make the weight matrix W smaller.

Figure 4:
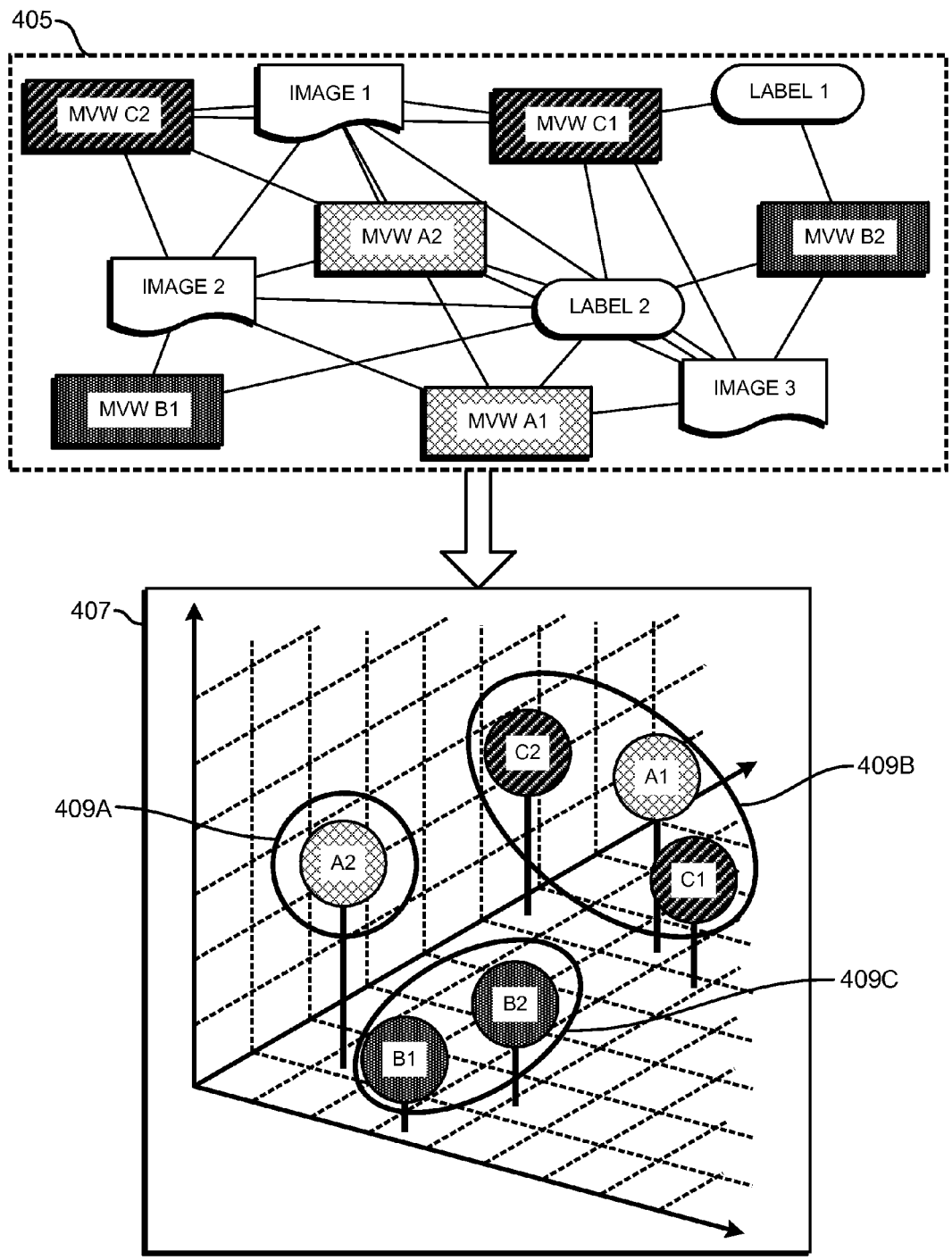
FIG. 4 illustrates an example embodiment of a representation of the relationships of features and an example embodiment of a vector space.

FIG. 4 illustrates an example embodiment of a representation 405 of the relationships of MVWs ("relationship representation 405") and an example embodiment of a vector space 407. The relationship representation 405 is illustrated in the form of a graph and includes eleven nodes: six MVWs (A1, A2, B1, B2, C1, C2), three images, and two labels. The edges of the graph represent the relationships (e.g., co-occurrence relationships) among the nodes. Performing the operations in block 330 on the relationship representation 405 generates a vector space 407. The vector space 407 in this embodiment includes the six MVWs. The Euclidian distances between the six MVWs represent the revised relationships of the six MVWs. The six MVWs may be clustered in the vector space 407 to generate high-level visual words 409. In this embodiment, the six MVWs are clustered in the vector space 407 according to distance, and three high-level visual words are generated: a first HVW 409A, a second HVW 409B, and a third HVW 409C.

Figure 5:
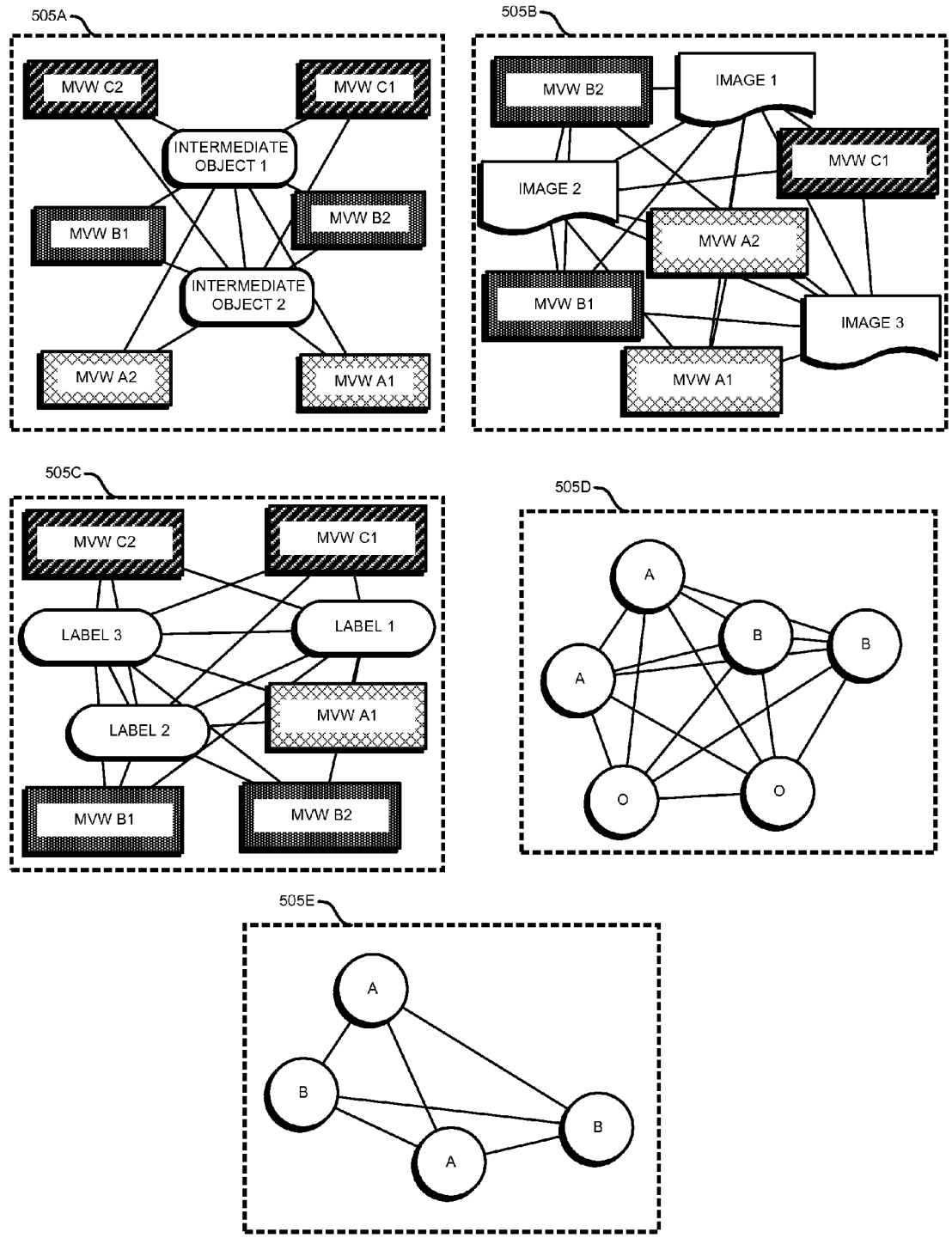
FIG. 5 illustrates example embodiments of relationship graphs.

FIG. 5 illustrates example embodiments of relationship graphs. A first relationship graph 505A includes edges between MVWs and intermediate objects. However, the first relationship graph 505A does not include edges between MVWs and other MVWs. Intermediate objects may include labels, images, patches of an image, and other objects that can have a direct relationship with different MVWs, different low-level features, or different types of low-level features or MVWs. A second relationship graph 505B includes edges between MVWs and images and between MVWs of the same type. Thus, MVW B1 has edges to the three images and to MVW B2. A third relationship graph 505C includes edges between low-level features and labels (an example of an intermediate object), but does not include edges between low-level features. Also, other embodiments of graphs may include edges between all of the nodes (e.g., MVWs, low-level features, images, labels) or between other combinations of the nodes. A fourth relationship graph 505D illustrates a graph with nodes constructed from visual words of feature type A (denoted by A) and visual words of feature type B (denoted by B). Additionally an intermediate object (e.g., an image, a label, another feature type) is included in the fourth relationship graph 505D (denoted by O). In some embodiments, the relationships between features of type A and features of type B are generated through relationships between features of type A and the intermediate objects and features of type B and the intermediate objects.

For example, in some embodiments the matrix A represents a bag-of-words table, where each row i and column j is related to the number of visual words of feature-type A, corresponding to the j-th visual word that occurred in image i. And the matrix B represents a bag-of-words table for feature-type B. The relationships between all A and B nodes can be written as the dot product of the image expressions:

$$A^T B. \qquad (6)$$

The relationships within all A nodes and B nodes are given by $$A^T A \text{ and } B^T B. \qquad (7)$$

And the image-to-image relationships are given by an A-and-B concatenated bag-of-words inner-product:

$$AA^T + BB^T. \qquad (8)$$

However a more general graph, for example a fifth relationship graph 505E, may not include the type O nodes, and may include only type A and type B nodes. To generate this graph 505E there must be cross-feature relationships (e.g., links between type A nodes and type B nodes). In some embodiments, the links between nodes of type A and type B are generated using one or more intermediate objects, though the one or more intermediate objects are not included in the graph 505E.

Therefore, in some embodiments the graph is constructed using equations (6) and (7) but the graph does not necessarily include the edges described by equation (8). Also, in some embodiments, equations (6) and (7) are used where matrix A is the table of the bag-of-words for feature-type A for each image and where matrix B is the table of the bag-of-words for feature-type B for each image. Additionally, in some embodiments a bag-of-words table is constructed on a label-by-label basis instead of, or in addition to, an image-by-image basis. In such embodiments, matrix A can represent the table of bag-of-words for feature type A for each label, and matrix B can represent the table of the bag-of-words for feature type B for each label. In further embodiments, the relationship between a visual word of feature-type A and visual word of feature-type B is based on a similarity of a third feature type associated with each of feature-types A and B.

Figure 6:
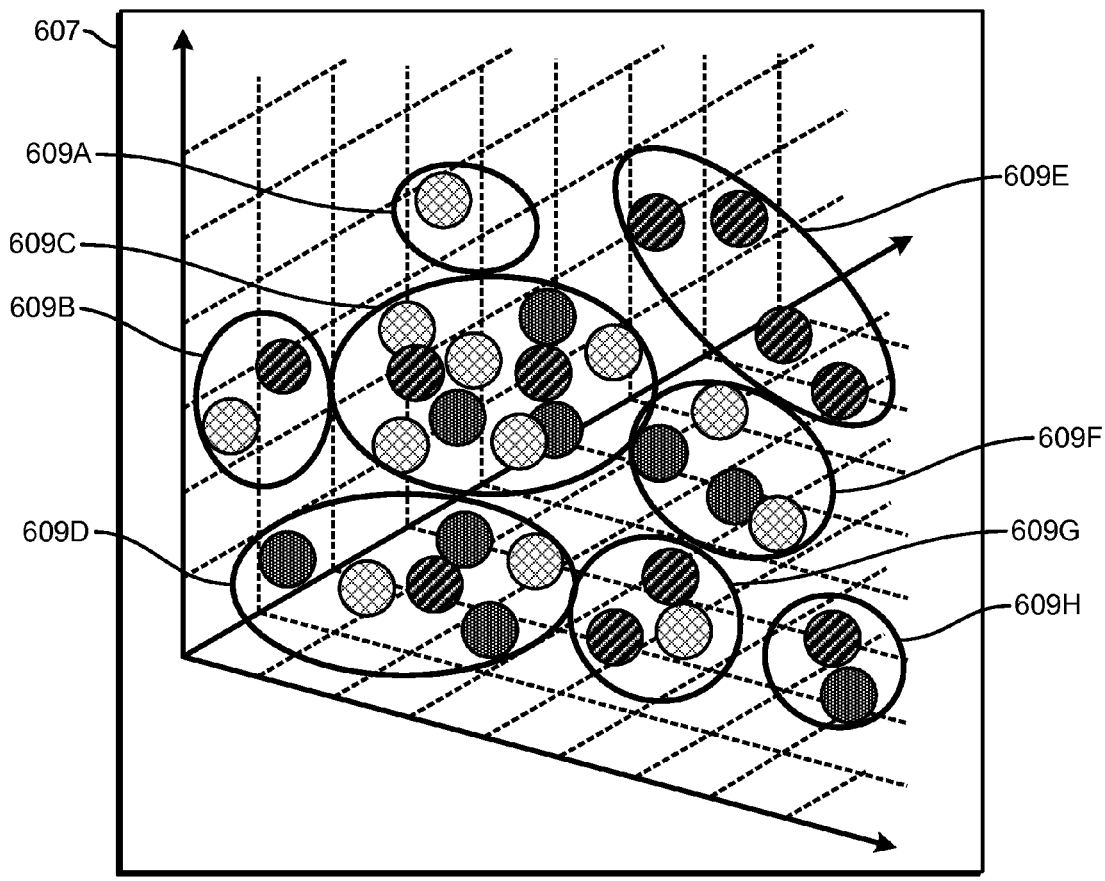
FIG. 6 illustrates example embodiments of visual words in a vector space.

FIG. 6 illustrates example embodiments of high-level visual words 609 (e.g., 609A-609H) in a vector space 607. High-level visual words, such as HVW 609A, may include one MVW, may include multiple MVWs of the same type (e.g., HVW 609E), and may include different types of MVWs (e.g., HVW 609D).

Figure 7:
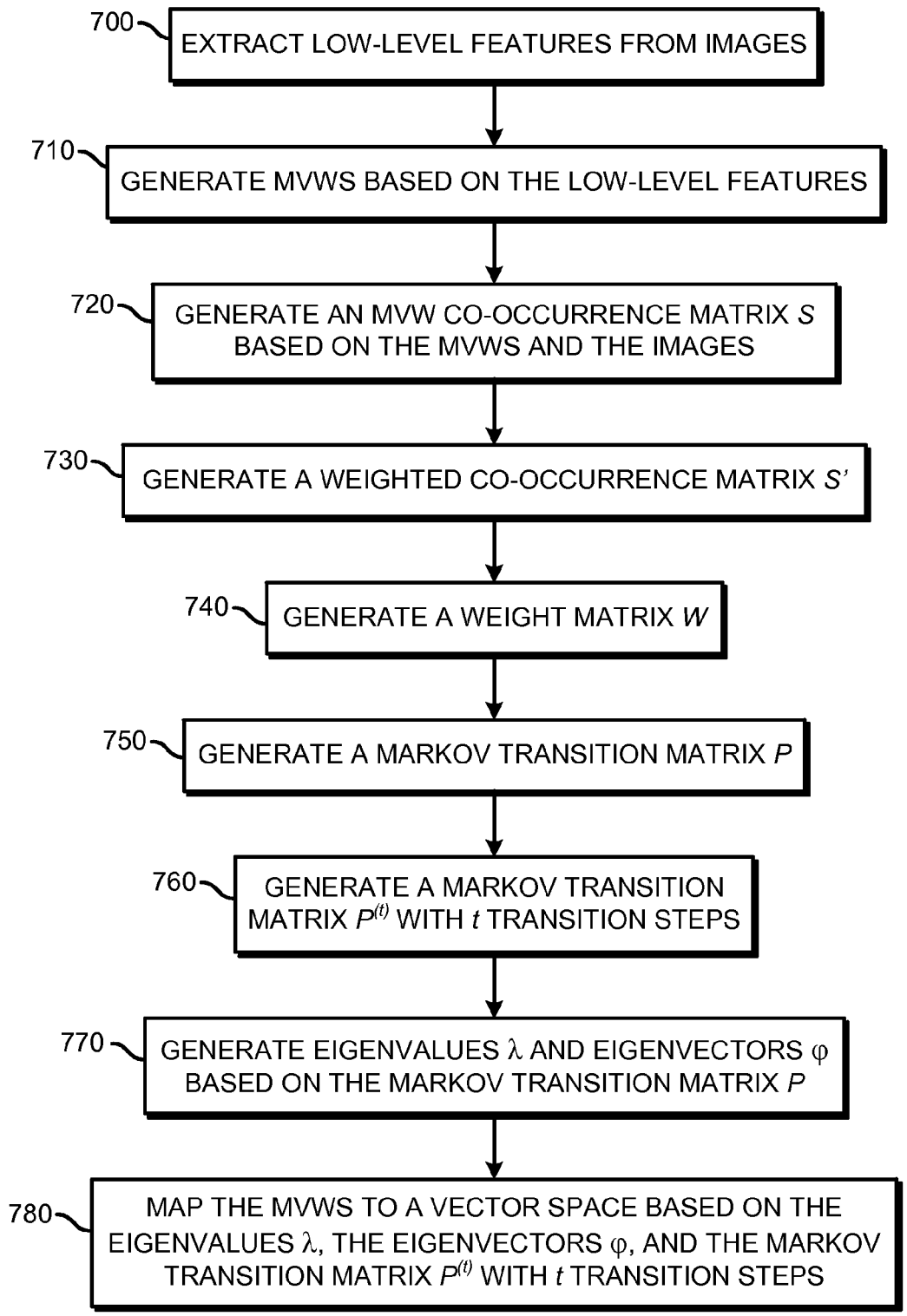
FIG. 7 illustrates an example embodiment of a method for generating revised relationships.

FIG. 7 illustrates an example embodiment of a method for generating revised relationships. The flow starts in block 700, where low-level features are extracted from images. The flow then moves to block 710, where MVWs are generated based on the low-level features. For example, a set of ISA MVWs of size $N_{isa}$ and a set of color SIFT MVWs of size $N_{c-SIFT}$ may be generated. Next, in block 720, an MVW co-occurrence matrix S is generated based on the MVWs and the images. For example, a $(N_{isa}+N_{c-SIFT}) \times N_{image}$ MVW-Image co-occurrence matrix S may be generated by counting the frequency of the MVWs in each image. The flow then proceeds to block 730, where a weighted co-occurrence matrix S' is generated, for example by weighting S by using tf-idf to generate a weighted co-occurrence matrix S'. Next, in block 740, a weight matrix W is generated. For example, a weight matrix W may be constructed by computing an Image-MVW similarity block in W from the corresponding value of S' and by computing Image-Image and MVW-MVW similarity blocks from the inner products of the rows and columns of matrix S', respectively.

The flow then proceeds to block 750, where a Markov transition matrix P is generated. For example, the weight matrix W may be normalized according to equation (2), such that its rows add up to 1. Following, in block 760, a Markov transition matrix $P^{(t)}$ with t number of transition steps (also referred to herein "a Markov transition matrix $P^{(t)}$ with t transition steps") is generated. The flow then moves to block 770, where eigenvalues $\lambda$ and eigenvectors $\phi$ are generated based on the Markov transition matrix P. For example, eigendecomposition may be performed on P to obtain eigenvalues $\lambda$ and eigenvectors $\phi$ according to equation (4). Finally, in block 780, the MVWs are mapped to a vector space based on the eigenvalues $\lambda$, the eigenvectors $\phi$, and the Markov transition matrix $P^{(t)}$ with t transition steps. Additionally, the MVWs (and, in some embodiments, the labels, the images, or the features) may be clustered in the vector space to generate high-level visual words.

Figure 8:
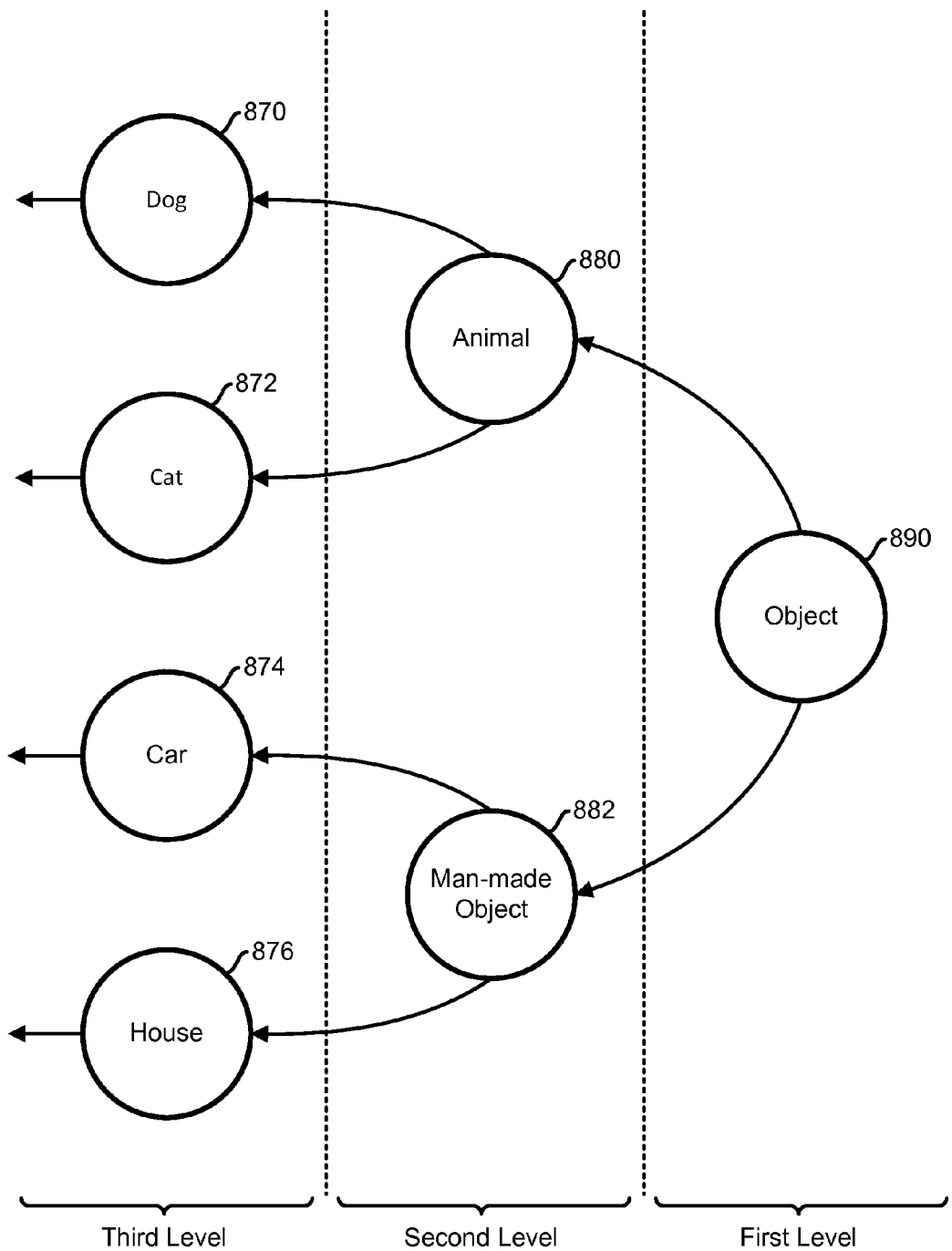
FIG. 8 illustrates an example embodiment of an object hierarchy.

FIG. 8 illustrates an example embodiment of an object hierarchy. Semantic label hierarchies may be used to generate a visual vocabulary. In general, attempts to encode the semantic meaning of raw features into visual vocabularies can be divided into two major classes: the supervised methods and the unsupervised methods. The supervised methods use local patch annotation or image annotation to enforce the connections of features when building the semantic vocabularies. For example, based on the bag-of-word model, several embodiments attempt to create a semantic vocabulary by exploring the mutual information between features and class labels. On the other side, several unsupervised embodiments are based on the topic model. The hidden topics correspond to a semantic visual vocabulary, and each image is represented as a mixture of the hidden topics. The hidden topic may be learned based on the co-occurrence of semantically similar features.

Unsupervised high-level visual-vocabulary-learning methods usually have no need for labeled data. While in some circumstances this is advantageous, in circumstances when labeled data that describes object labels (e.g., object categories, tags) is available these methods do not take the discriminative information among labels into account. Thus, the learned high-level features may not be capable of capturing the dissimilarities between different object labels and the similarities of the same labels. Moreover, they may not be able to provide a semantic meaning with each high-level feature, such as a semantic meaning that may need to be learned based only on the co-occurrence information.

Among the supervised learning methods, many of them treat the labels as mutually independent labels. For example, dogs, cats, and cars may be treated as three different labels. Regardless of whether a dog image is classified as a cat or a car, the classification will be considered to be a false detection with the same penalty value by many methods. However, the hierarchy relationship between labels may be useful. For example, cats and dogs are often considered to be more similar than cats and cars. Given a cat as a query image, many users prefer the dog's image to the car's image as a query result because the cats and dogs share more features and attributes. Therefore, some embodiments use the label relationships to learn the high-level semantic visual vocabulary.

Additionally, very few of either the supervised or the unsupervised learning methods try to explicitly preserve the manifold geometry of the feature space when constructing a semantic visual vocabulary. Some embodiments use the diffusion distance and its embedding to maintain the local geometric structure between the features.

Some embodiments of the systems, devices, and methods learn a semantic visual vocabulary by using an object hierarchy, feature-object co-occurrence, and feature-to-feature similarities. Relationships between object labels are defined, and an object hierarchy is built. For example, if the hierarchy is a tree structure, cats and dogs, which are the children nodes in the tree, will have the same parent node 'mammals'. Going further, 'mammals' and 'fish' will have the same parent node 'animals'. Even further, 'animals' and 'cars' will both have the same parent node 'objects'. This indicates that the distance, denoted by $D_L$, between objects is not uniform. Some are nearer and some are farther away from each other. Using the above example, cats are more similar to dog than to cars, so the distance $D_L$ (cat, dog) between cats and dogs should be smaller than the distance $D_L$ (cat, car) between cats and cars in the object-hierarchy space. Meanwhile, in addition to the hierarchical relationship between labels, there may also be a strong correlation (e.g., co-occurrence) between the features and labels. For example, the features about eyes are more likely appear in the images about animals, and the features about wheels are often detected in the images of vehicles. $D_{FL}$ represents the correlation between features and labels. In some embodiments, the higher the correlation is, the smaller the distance. So $D_{FL}$ (eye, cat) may be much smaller than $D_{FL}$ (tire, cat) based on the co-occurrence. Moreover, the similarity of features $D_F$ may also be used to construct a semantic visual vocabulary because the similarity of features $D_F$ captures the appearance information between features, and some embodiments are designed to group the features that have similar appearances (e.g., different kinds of ears of cats) into a semantic high-level feature.

Referring to FIG. 8, the object hierarchy describes the relationships between labels and their associated objects. For example, the third level includes a 'dog' 870, a 'cat' 872, a 'car' 874, and a 'house' 876. The 'dog' 870 and the 'cat' 872 are children of 'animal' 880, which is in the second level. Also, the 'car' 874 and the 'house' 876 are children of 'man-made object' 882, which is in the second level. Finally, 'animal' 880 and 'man-made object' 882 are children of 'object' 890, which is in the first level. If the distance between two objects or labels is based on the shortest path between them in the tree, the distance between the 'dog' 870 and the 'cat' 872 is 2, and the distance between the 'dog' 870 and the 'car' 874 is 4. Therefore, the 'dog' label 870 is closer to the 'cat' label 872 than the 'car' label 874.

Figure 9:
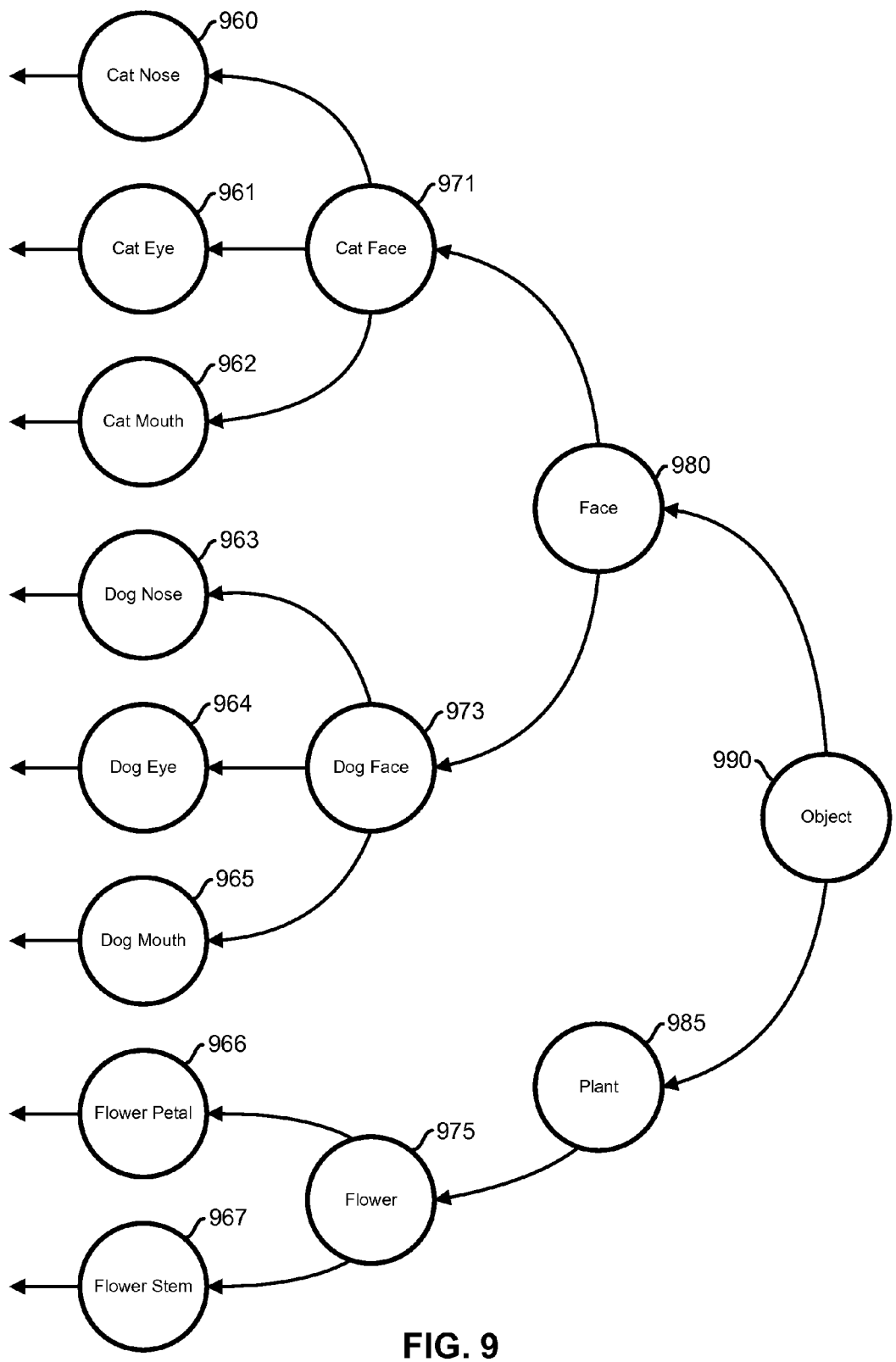
FIG. 9 illustrates an example embodiment of an object hierarchy.

FIG. 9 illustrates an example embodiment of an object hierarchy. The hierarchy includes 'cat nose' 960, 'cat eye' 961, and 'cat mouth' 962, which are children of 'cat face' 971. The hierarchy also includes 'dog nose' 963, 'dog eye' 964, and 'dog mouth' 965, which are children of 'dog face' 973. Additionally, 'cat face' 971 and 'dog face' 973 are children of 'face' 980. 'Flower petal' 966 and 'flower stem' 967 are children of 'flower' 975, which is a child of 'plant' 985. Finally, 'face' 980 and 'plant' 985 are children of 'object' 990. As shown in FIG. 9, the hierarchy may define relationships between components (e.g., eye, nose, tail, leaf, wheel, window) of larger objects.

Figure 10:
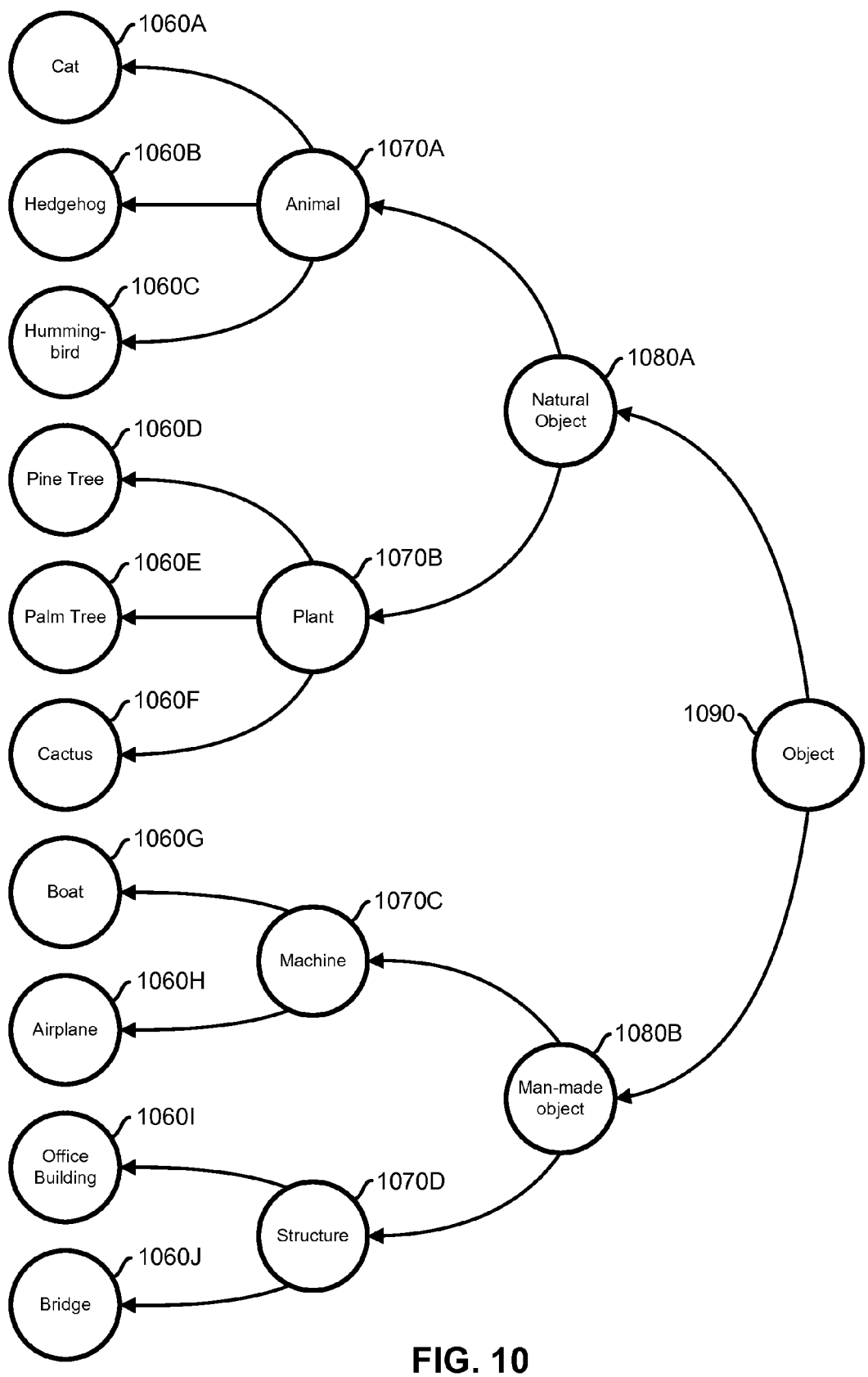
FIG. 10 illustrates an example embodiment of an object hierarchy.

FIG. 10 illustrates an example embodiment of an object hierarchy. The hierarchy includes 'animal' 1070A, which has children 'cat' 1060A, 'hedgehog' 1060B, and 'hummingbird' 1060C. 'Plant' 1070B has children 'pine tree' 1060D, 'palm tree' 1060E, and 'cactus' 1060F. 'Animal' 1070A and 'plant' 1070B are children of 'natural object' 1080A.

Also, 'machine' 1070C has children 'boat' 1060G and 'airplane' 1060H. 'Structure' 1070D has children 'office building' 10601 and 'bridge' 1060J. 'Machine' 1070C and 'structure' 1070D are both children of 'man-made object' 1080 B. Finally, 'man-made object' 1080B and 'natural object' 1080A are children of object 1090.

Furthermore, for example, the distance between 'cactus' 1060F and 'airplane' 1060H may be defined to be 6. In some embodiments, for example where a distance between objects is based on the furthest distance of one of the objects to the closest common parent ('object' 1090 in this example), the distance between 'cactus' 1060F and 'airplane' is 3.

Figure 11:
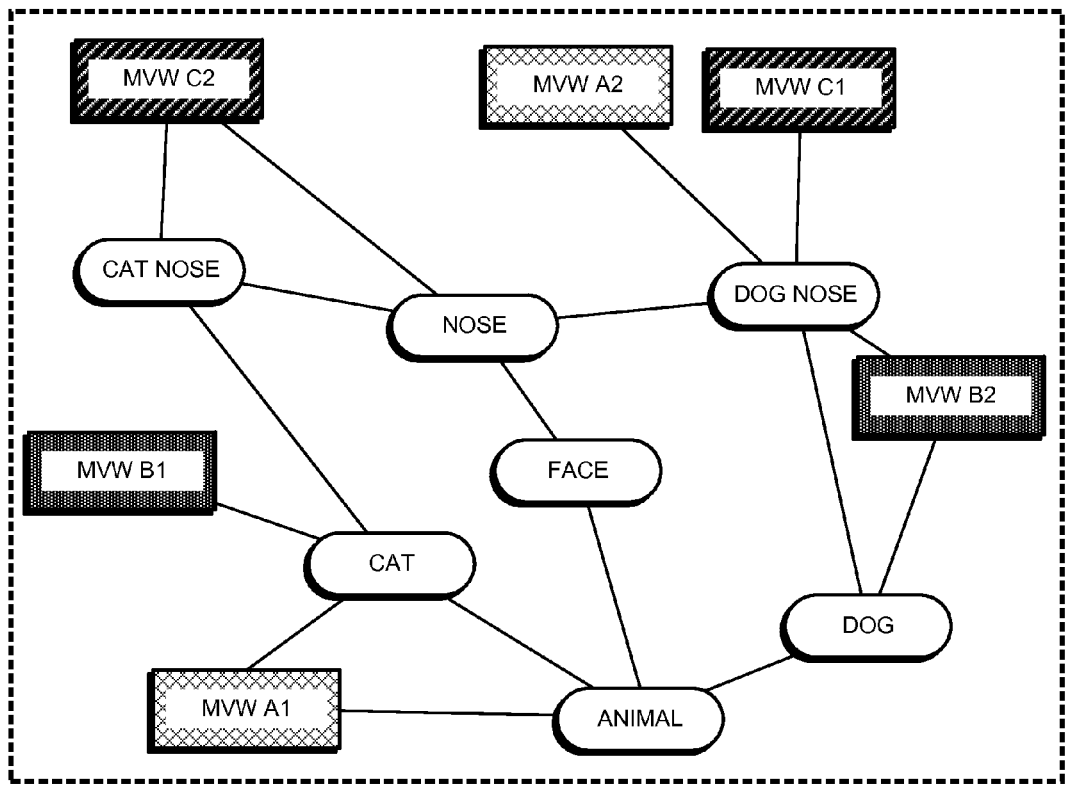
FIG. 11 illustrates an example embodiment of a relationship graph.

FIG. 11 illustrates an example embodiment of a relationship graph. To model the three types of relationships (inter-MVW, inter-label, and label-MVW), a graph is generated using MVWs and labels as nodes and their relationships as edges. The different types of relationships between MVWs and labels are encoded into the edge weights of the graph. The inter-MVW relationships may be generated via the label nodes by conducting a Markov random walk in a certain number of transition steps. The MVW-MVW similarities are further measured by diffusion distances that account for all three types of relationships. Based on the new similarities, the semantic visual vocabulary can be constructed by grouping similar features.

Each MVW node in the graph may actually be a high-dimensional data point. Directly computing the diffusion distance in that space is computational expensive. Hence, this graph may be mapped to or embedded into a lower-dimensional space (e.g., a vector space) using diffusion map embedding, which can maintain the local structure of the nodes in the original higher-dimensional space. Moreover, through the embedding, the Euclidean distances in the lower-dimensional space may be equal to or may approximate the diffusion distance in the higher-dimensional space. Therefore, the Euclidean distance can be directly used to measure the similarities between MVWs. Also, MVWs associated with the same semantic word are located nearby one another in the new space in some embodiments.

After the embedding, in some embodiments the MVWs are located near to the labels from which those features come (e.g., the wheels MVWs are still near to the car label), similar appearance MVWs are located near each other (e.g., the eye MVWs from cats and dogs are near each other), or the hierarchical relationships between labels are maintained (e.g., the distance $D_L$ (cat, dog) is still smaller than $D_L$ (cat, car)).

The hierarchical relationships between the objects may change after embedding due to consideration of the similarity of the MVWs. For example, $D_L$ (fish, dog) may become larger and may become similar to $D_L$ (fish, car) because both fish and cars share fewer feature with dogs. In other words, an effect in some embodiments is the refining of a human-defined label hierarchy through a visual-appearance-similarity measure.

Also, some embodiments include multi-feature fusion. Instead of computing appearance similarity between only the same types of MVWs, the co-occurrence similarity can be calculated to also measure the relationships between different types of MVWs. For example, in some embodiments the MVWs about green grass are embedded in the center of the dog, cat, and car labels in the vector space because green grass appears in images with cats, dogs, and cars with roughly equal frequency. This indicates that the green-grass MVWs are not informative enough to distinguish among cats, dogs, and cars. Thus, the distance of MVWs to labels after the embedding in the vector space can be used to measure the ability of an MVW to recognize the label, or the uniqueness of each MVW to the label. In some embodiments, this information is further used as a weight to reshape the final representation based on the semantic visual vocabulary.

Additionally, some embodiments of the graph (as well as embodiments of the other systems and methods described herein) may operate on low-level features instead of MVWs. Thus, the three types of relationships that these graphs model are inter-feature relationships, inter-label relationships, and label-feature relationships. The HVWs in the vector space may be defined based on clusters of features in the vector space. A new feature may be mapped to an HVW by determining the nearest classified feature to the new feature and mapping the new feature to the same HVW as the nearest classified feature.

Figure 12:
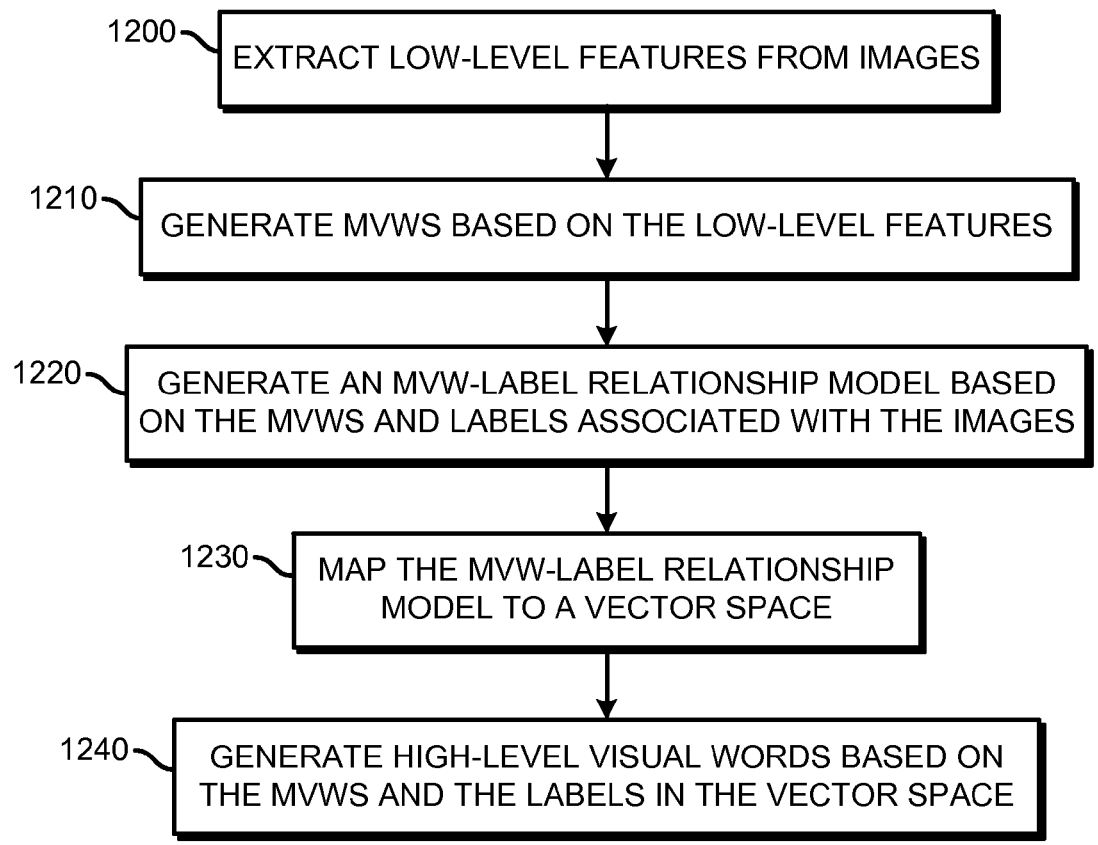
FIG. 12 illustrates an example embodiment of a method for generating high-level visual words.

FIG. 12 illustrates an example embodiment of a method for generating high-level visual words. In block 1200 low-level features are extracted from images, for example using color-SIFT. Next, in block 1210, MVWs are generated based on the low-level features. For example, k-means clustering may be used to learn the MVWs based on the low-level features. Next, in block 1220 an MVW-label relationship model (e.g., inter-MVW relationships, MVW-label relationships, inter-label relationships) is generated based on the MVWs and the labels associated with the images. For example, a graph may be constructed using the MVWs and the labels as nodes. The edges between MVWs, between MVWs and labels, and between labels are calculated based on the MVW-MVW appearance similarity, MVW-label co-occurrence, and label hierarchy relationships, respectively. Also, the MVW-label relationship model may include a weight matrix W. The flow then proceeds to block 1230, where the MVW-label relationship model is mapped to a vector space. For example, in some embodiments diffusion map embedding is used to embed the nodes of the MVW-label relationship model into a vector space (e.g., a lower-dimensional space). Next, in block 1240, HVWs are generated based on the MVWs (and, in some embodiments, the labels) in the vector space. For example, in the vector space, neighboring MVW nodes can be grouped into a semantic high-level visual vocabulary. Also, the grouping index, which maps MVWs to HVWs, is saved. This allows HVWs to be obtained directly from MVWs by using the grouping index. Thus, a new image can be represented based on the semantic high-level visual vocabulary. Additionally, an applicable classifier (e.g., SVM) may be used to generate a new semantic representation for an image by describing the image with the HVWs, or the semantic vocabulary may be used to find images that have similar semantic representations (e.g., during an image search).

In some embodiments, the labels mapped to the vector space can create an evidenced-based semantic similarity because the mapping is influenced by the original predetermined ontology and the evidence provided by the corpus of image MVWs and the relationships between the MVWs and the labels. In some embodiments, the vector-space distance created by a corpus of labeled MVWs can be used as a new semantic-distance measure between labels, which can be used to define the relationships in a recursive manner or completely used in another dataset. For example, the respective positions of the labels in the vector space can be used to define a new ontology between the labels, for example an ontology that is based on the distances between the labels in the vector space.

Advantages of some of these embodiments include the use of the label information of training images to obtain the object-hierarchy relationships and to enforce the similarity of features from the same or similar labels. During image testing, the label of each image is unknown: the semantic visual vocabulary is just a mapping from MVWs to HVWs. Also some embodiments do not need to calculate the diffusion map embedding or to construct the graph. Hence, the application time (the time it takes to apply the vocabulary to new images) is relatively fast once the semantic vocabulary is built.

Figure 13:
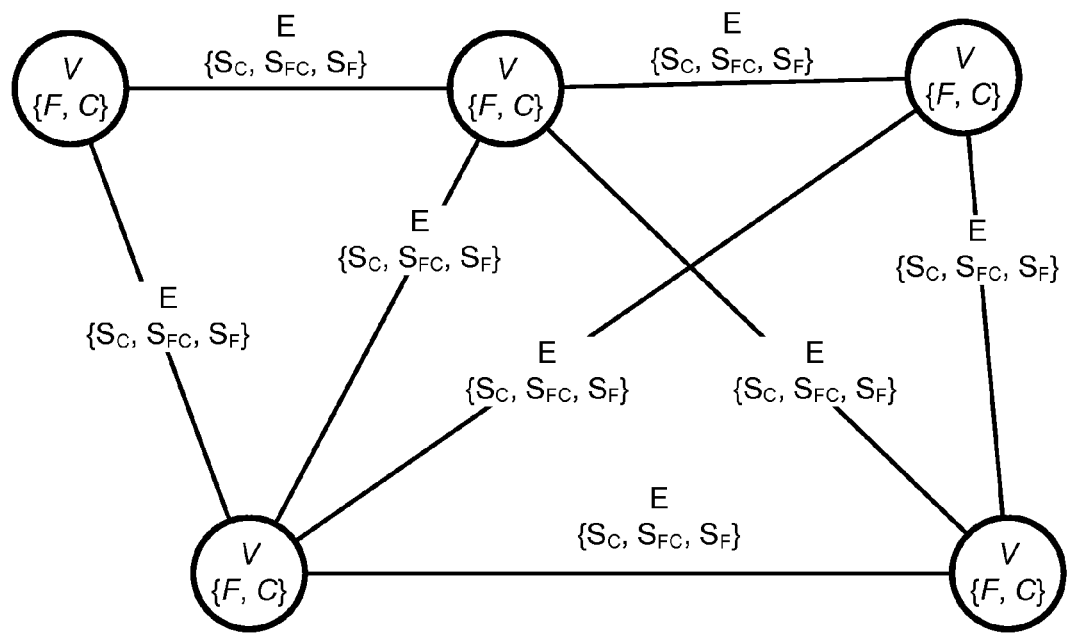
FIG. 13 illustrates an example embodiment of a relationship graph.

FIG. 13 illustrates an embodiment of a relationship graph G (V, E). V refers to a node and E refers to an edge. Nodes V include MVWs F and labels C. Edges E include label-to-label similarity $S_C$, which define label hierarchical relationships; MVW-label co-occurrence $S_{FC}$; and MVW-to-MVW similarity $S_F$.

Label-to-label similarity $S_C$ defines the similarity of labels, including label hierarchical relationships. In one embodiment, WordNet provides a cost matrix COST (number-of-label×number-of-label) to define the distances among labels. To reverse the COST matrix into similarity matrix $S_C$, some embodiments use a Gaussian kernel, as shown in equation (9):

$$S_C = \exp\left(-\frac{COST^2}{2\sigma^2}\right). \tag{9}$$

MVW-label similarity $S_{FC}$ defines the similarity of MVWs to labels. Some embodiments use the co-occurrence of MVWs with labels to calculate the MVW-label similarity. To calculate the co-occurrence of the $i^{th}$ MVW node to the $j^{th}$ label, some embodiments count the number of times $h_{ij}$ that the $i^{th}$ MVW is extracted from the $j^{th}$ label, as shown in equation (10):

$$S_{FC}(i, j) = \exp\left(-\frac{1/h_{ij}^2}{2\sigma^2}\right). \tag{10}$$

To calculate the MVW-MVW similarity $S_F$ between $f_i$ and $f_j$, some embodiments directly use the Euclidean distance between the MVW centers of $f_i$ and $f_j$, as shown in equation (11):

$$S_F(i, j) = \exp\left(-\frac{\|f_i - f_j\|^2}{2\sigma^2}\right). \quad (11)$$

The edges E of the graph G can be further written as a weight matrix W that is calculated from the three types of similarities: $S_C$, $S_{FC}$, $S_F$. Therefore, W may have the following block structure shown in equation (12):

$$W = \begin{pmatrix} \alpha S_C & \beta S_{FC}^T \\ \beta S_{FC} & \gamma S_F \end{pmatrix}, \quad (12)$$

where $\alpha$, $\beta$, $\gamma$, respectively, denote the weights of the three types of relationships. For example, if $\beta \gg \gamma$, greater emphasis is placed on the MVW-label co-occurrence rather than the MVW-MVW similarities.

As mentioned above, given the weight matrix W, the transition matrix $P = P^{(1)} = \{p_{ij}^{(1)}\}$ may be generated by normalizing matrix W such that its rows add up to 1, according to equation (2). A transition matrix P defines the entire Markov chain, and $P^{(1)}$ reflects the first-order neighborhood geometry of the data. A random walk forward in t transition steps may be conducted to capture information on larger neighborhoods by taking powers of the transition matrix P, and the transition matrix for t transition steps, $P^{(t)}$, is given by $P^{(1)t}$.

The diffusion distance D between two nodes on the graph can be defined by using the random walk forward probabilities $p_{ij}^{(t)}$ to relate the spectral properties of a Markov chain to the underlying structure of the data. The diffusion distance D may be generated according to equation (3). Furthermore, d eigenvectors corresponding to the d largest eigenvalues can be selected to construct a vector space according to equation (4). Finally, the diffusion distance D in the vector space can be calculated according to equation (5).

Once the nodes in the graph have been embedded (or otherwise mapped) into the vector space, the nodes may be clustered into $N_h$ groups, each of which may define a high-level semantic visual word. In embodiments that use k-means, because the k-means virtually works on the semantic space, the Euclidean distance used in k-means can reveal the semantic distance between a pair of high-level visual words. Also, the clustering results can build a mapping between MVWs and the semantic vocabulary (high-level semantic visual words).

Figure 14:
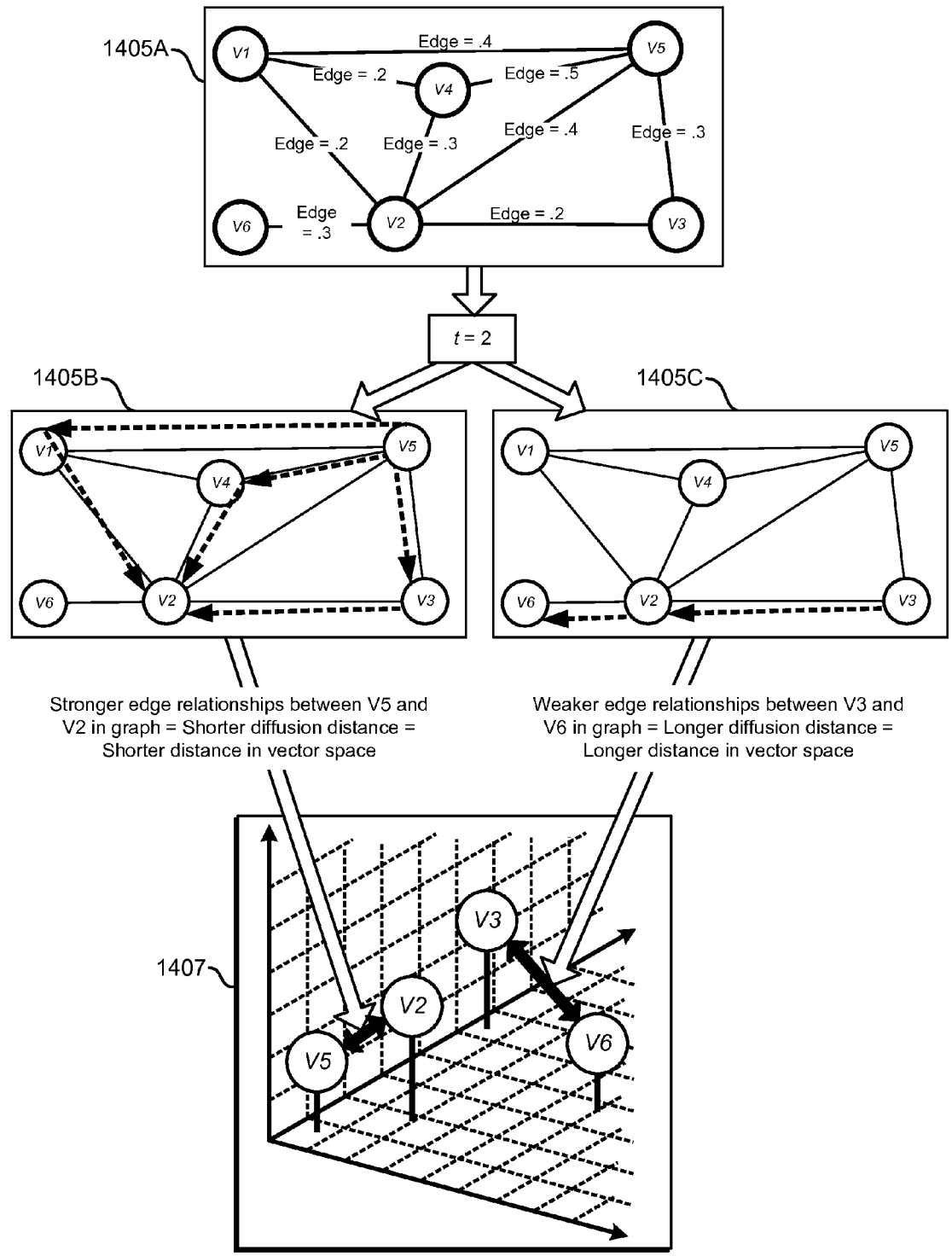
FIG. 14 illustrates an example embodiment of a mapping of relationships from a graph to a vector space.

FIG. 14 illustrates an embodiment of a mapping of relationships from a graph to a vector space. The edge weights between nodes V1-V6 are shown in a graph 1405A. Next, the diffusion distances between the nodes are determined for two transition steps (t=2). As shown in graph 1405B and graph 1405C, the edge relationships between V5 and V2 are stronger than the edge relationships between V3 and V6 and there are more paths between V5 and V2 than between V3 and V6 at t=2. Therefore, in the vector space 1407, the distance between V2 and V5 is less than the distance between V3 and V6.

Figure 15:
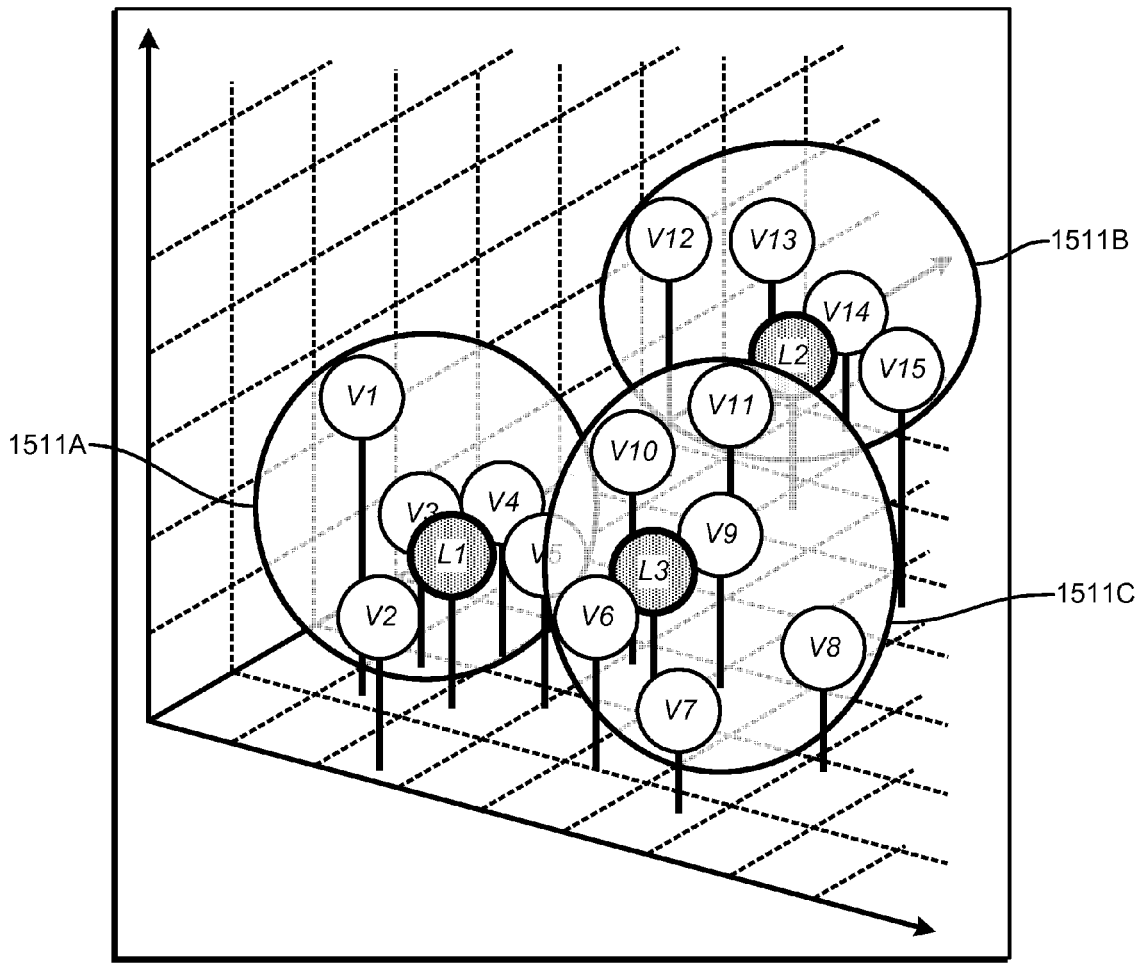
FIG. 15 illustrates an example embodiment of high-level visual words in a vector space.

FIG. 15 illustrates an example embodiment of high-level visual words 1511A-C (HVWs 1511A-C) in a vector space. A high-level visual word 1511 is generated from one or more clusters of MVWs. The MVWs (i.e., MVWs V1 to V15) are organized into clusters near labels (i.e., labels L1 to L3). The clusters may be formed, for example, by assigning MVWs to the closest label in the vector space, by clustering the MVWs without consideration of the labels (e.g., via k-means) and associating clusters with labels that happen to be inside the cluster, or by weighting the clustering to favor clustering of the MVWs near a label. One or more clusters are designated as an HVW 1511. The HVWs 1511A-C may be associated with the respective labels that are located within the space of the HVWs 1511A-C in the vector space. For example, if a first HVW 1511A includes the label L1, which is 'dog', the label 'dog' may be used to indicate the first HVW 1511A.

Figure 16:
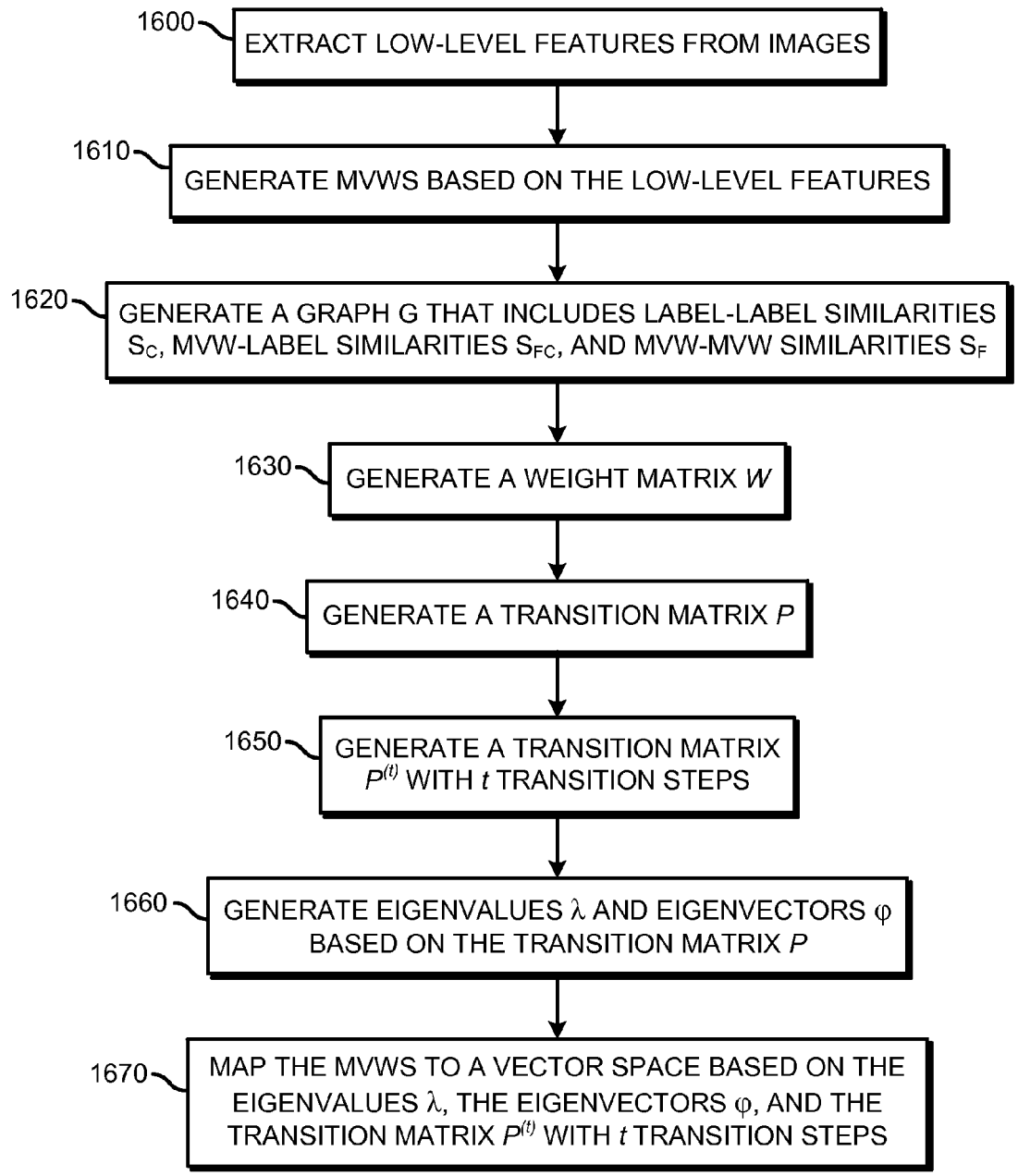
FIG. 16 illustrates an example embodiment of a method for generating revised relationships.

FIG. 16 illustrates an example embodiment of a method for generating revised relationships. The flow starts in block 1600, where low-level features are extracted from images. Next, in block 1610, MVWs are generated based on the low-level features. For example, some embodiments quantize low-level features into MVWs F with size $N_{mid}$ using k-means clustering. The flow then proceeds to block 1620, where a graph G is generated that includes label-label similarities $S_C$ (e.g., computed according to equation (9)), MVW-label similarities $S_{FC}$ (e.g., computed according to equation (10)), and MVW-MVW similarities $S_F$ (e.g., computed using equation (11)). Next, in block 1630, a weight matrix W is generated based on the graph G.

The flow then moves to block 1640, where a transition matrix P is generated based on the weight matrix W, for example by normalizing the weight matrix W using equation (2) such that its rows add up to 1. Next, in block 1650, a transition matrix $P^{(t)}$ with t transition steps is generated. Following, in block 1660, eigenvalues $\lambda$ and eigenvectors $\phi$ are generated based on the transition matrix P. For example, eigen-decomposition may be performed on the transition matrix P to obtain eigenvalues $\lambda$ and eigenvectors $\phi$ (e.g., using equation (4)).

The flow then proceeds to block 1670, where the MVWs are mapped to a vector spaced based on the eigenvalues $\lambda$, the eigenvectors $\phi$, and the transition matrix $P^{(t)}$ with t transition steps. For example, the MVWs can be embedded in the vector space according to equation (5). Finally, nodes (e.g., MVWs, labels) are clustered in the vector space into $N_h$ groups (e.g., using k-means clustering), and the grouping index I, which defines classifiers (e.g., functions that map an input to an output) that map MVWs or low-level features to clusters, is saved. HVWs are generated based on the $N_h$ groups. For example each of the $N_h$ groups may be designated as a respective HVW. A respective classifier may be trained for each HVW, and a strong classifier may be an aggregate of multiple weak classifiers.

Figure 17:
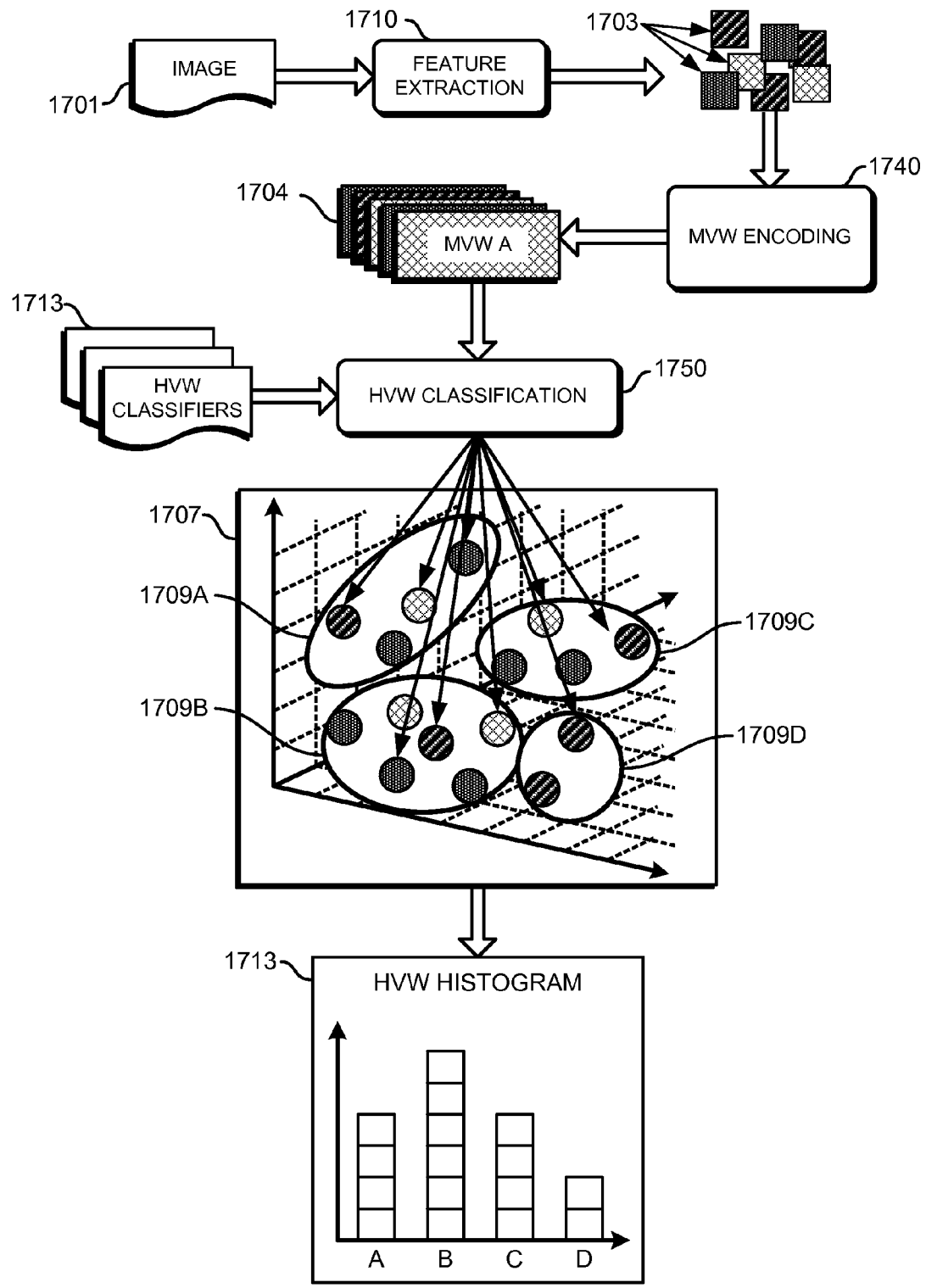
FIG. 17 illustrates an example embodiment of encoding an image according to a visual vocabulary.

FIG. 17 illustrates an example embodiment of encoding an image according to a visual vocabulary. An image 1701 is input to a feature extraction module 1710, which extracts low-level features 1703 from the image 1701. The image features 1703 are input to an MVW encoding module 1740, which maps the features to MVWs 1704. The MVWs 1704 and HVW classifiers 1713 are obtained by an HVW classification module 1750, which maps the MVWs to HVWs 1709 based on the HVW classifiers 1713. For explanatory purposes, the mappings to the HVWs 1709 are illustrated in the vector space 1707, even though the MVWs are not mapped explicitly to the vector space 1707 in every embodiment. An HVW histogram 1713 is generated to describe (e.g., encode) the image 1701 according to the HVWs 1709.

For example, in one experiment embodiment, a certain subset of the ImageNet dataset has 100 object labels, and each label has about 1000 training examples and 100 testing examples. The training examples were used to learn the HVWs, the grouping index I (which maps the MVWs to the HVWs), and the classifiers, which map HVWs to labels.

For the ISA-type features, 500 filters were learned. Instead of interesting-point detection, non-overlapped dense sampling was used to extract the features for each local patch.

After that, the codebook (e.g., the dictionary, which builds an MVW-based representation by using the codebook from the low-level ISA features, that maps low-level ISA features to MVWs), with codebook size $N_{isa}=3000$, was learned from the features. For the color-SIFT features, SIFT interesting-point detection was used, and the features were extracted around the interesting point based on three channels. Similarly, after extracting the color-SIFT features, another codebook with $N_{c-SIFT}=3000$ was generated. Then the MVW-Image co-occurrence matrix S was generated with the tf-idf weighted matrix S'. The weight matrix W was generated using the Gaussian-kernel function with sigma equals 2. The Markov random walk at 5 (t=5) transition steps was performed to generate the transition matrix $P^{(5)}$. Through diffusion mapping, eigen-decomposition, and choosing d=500, the ISA MVWs, the color-SIFT MVWs, and the images were embedded into a 500-dimensional vector space. The features were clustered in the 500-dimensional vector space into 2000 (k=2000) groups, which were designated as the HVWs. Each image was then represented according to the HVWs, and the classifiers were trained on the HVWs.

To compare the experiment with others, other methods were performed: two other feature fusion methods for early fusion and one other for late fusion. For the early fusion methods, one directly connects the two feature vectors for each interesting point, then learns the codebook (3000 in this experiment) based on the combined features. Because ISA is a dense sampling, the experiment used the interesting-point location of color-SIFT features and found the nearest local patch of ISA. Another experiment first learned the codebook separately (each feature type had a codebook size of 3000, so the total codebook size was 6000), then combined the histograms of each image. For late fusion, the experiments ran the classifiers separately on each feature first, and then simply selected the label with the maximum confidence score. The experiments used k-nearest-neighbor as the classifier with a cosine kernel. Table 1 shows the error rate for each method.

TABLE 1

Recognition error-rate results of different methods on a subset of ImageNet.

| | Single ISA | Single C-SIFT | Early Fusion Method 1 | Early Fusion Method 2 | Late Fusion | Experiment Embodiment |
|---|---|---|---|---|---|---|
| First 5 labels | 0.51 | 0.47 | 0.52 | 0.49 | 0.50 | 0.45 |
| 100 labels | 0.85 | 0.79 | 0.851 | 0.83 | 0.83 | 0.76 |

Also for example, another experiment embodiment used a subset of the ImageNet dataset that had 50 object labels, and each object label had about 1000 training examples and 100 testing examples. The training set was used to learn the HVWs, the feature-fusion mapping index, and the classifiers.

For the color-SIFT features, SIFT interesting-point detection was used, and the features around the interesting point were extracted based on three channels. After extracting the color-SIFT features, the MVWs were learned using k-means clustering with $N_{mtid}=4000$. Next, the MVW-label similarity matrix S was generated. The weight matrix W was generated from the similarity matrix S using the Gaussian-kernel function with sigma equals 2. A Markov random walk was performed with 4 (t=4) transition steps to generate the transition matrix $P^{(4)}$. Through diffusion mapping, eigen-decomposition, and choosing d=800, the color-SIFT MVWs and images were mapped to an 800-dimensional vector space. The MVWs were clustered into 2000 (k=2000) groups, which were each designated as an HVW. Finally, each image was represented using the HVWs, and the classifiers were trained on the HVWs.

The results from this experiment embodiment were compared with other results based on two evaluation metrics. One is the traditional evaluation metric, which does not consider the hierarchical relationships between object labels. The penalty for false detection is always 1 for each test image. The other metric accounts for the hierarchical relationship. For example, the penalty for detecting a 'dog' as a 'cat' is much smaller than for detecting a 'dog' as a 'car'. The normalized cost matrix was used to give the penalty.

This experiment embodiment was compared to the traditional bag-of-word method (BOW). The BOW method also uses color-SIFT as low-level features and uses k-means to learn a codebook with a size of 2000. k-nearest-neighbor was used as the classifier with cosine kernel for all methods during the experiment. Table 2 shows the accuracy for each method and each evaluation metric.

TABLE 2

Recognition results of different methods on a subset of ImageNet.

| Evaluation metric 1 (equal cost) | BOW method Accuracy | Experiment Embodiment Accuracy | Evaluation metric 2 (hierarchical cost) | BOW method Accuracy | Experiment Embodiment Accuracy |
|---|---|---|---|---|---|
| First 20 labels | 46% | 47% | First 20 labels | 51% | 59% |
| 50 labels | 35% | 37% | 50 labels | 34% | 43% |

Figure 18:
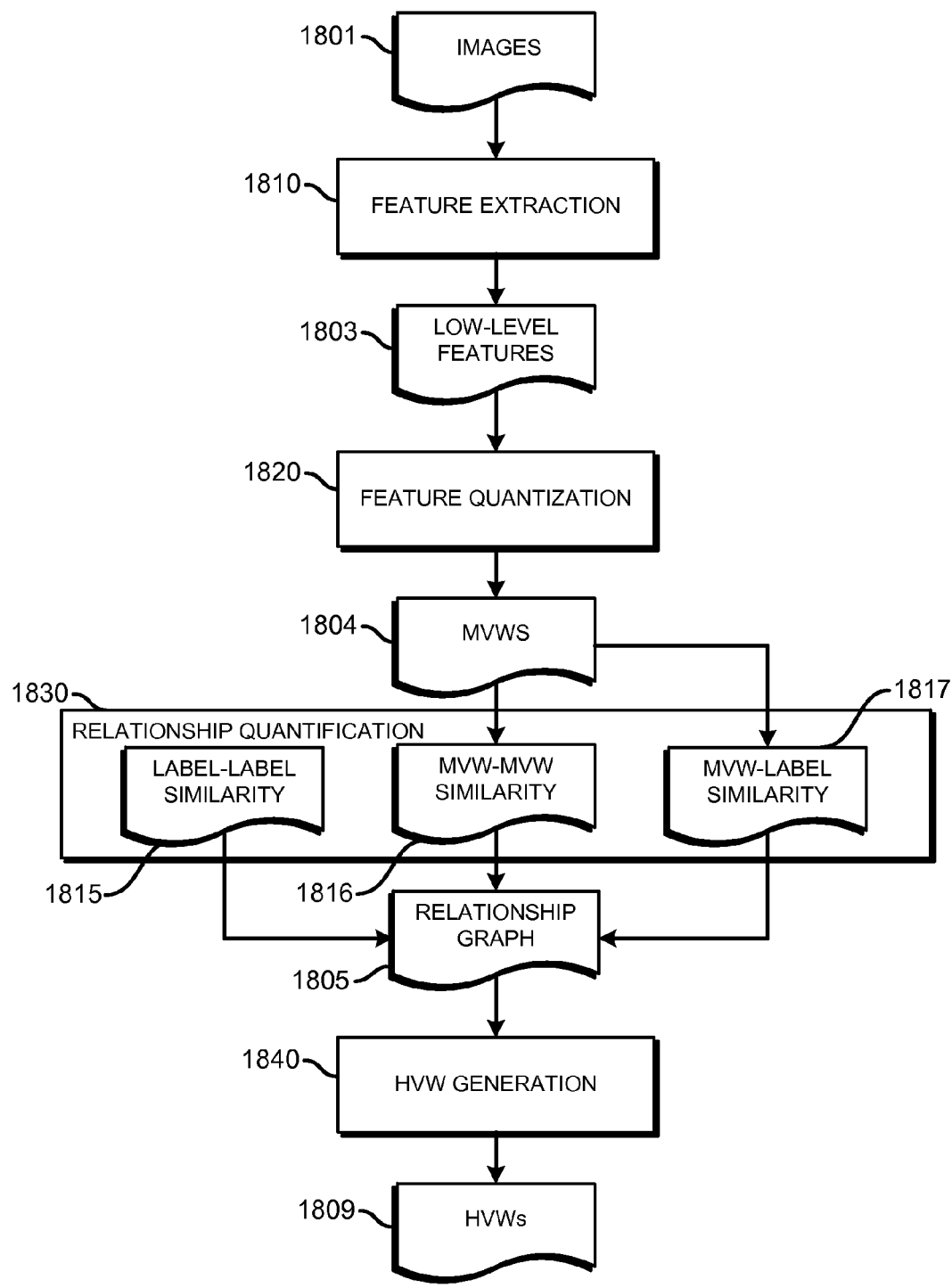
FIG. 18 illustrates an example embodiment of the flow of operations in a system for generating a visual vocabulary.

FIG. 18 illustrates an example embodiment of the flow of operations in a system for generating a visual vocabulary. One or more images 1801 are input to a feature-extraction module 1810, which extracts low-level features 1803 from the images 1801. The low-level features 1803 are input to a feature-quantization module 1820, which generates MVWs 1804 based on the low-level features 1803.

A relationship-quantification module 1830 obtains the MVWs 1804 and, based on the MVWs and one or more labels, calculates label-label similarities 1815, MVW-MVW similarities 1816, and MVW-label similarities 1817. Also, the relationship-quantification module 1830 generates a relationship graph 1805 based on the label-label similarities 1815, the MVW-MVW similarities 1816, and the MVW-label similarities 1817. An HVW-generation module 1840 obtains the relationship graph 1805 and generates HVWs 1809 based on the relationship graph 1805.

Figure 19:
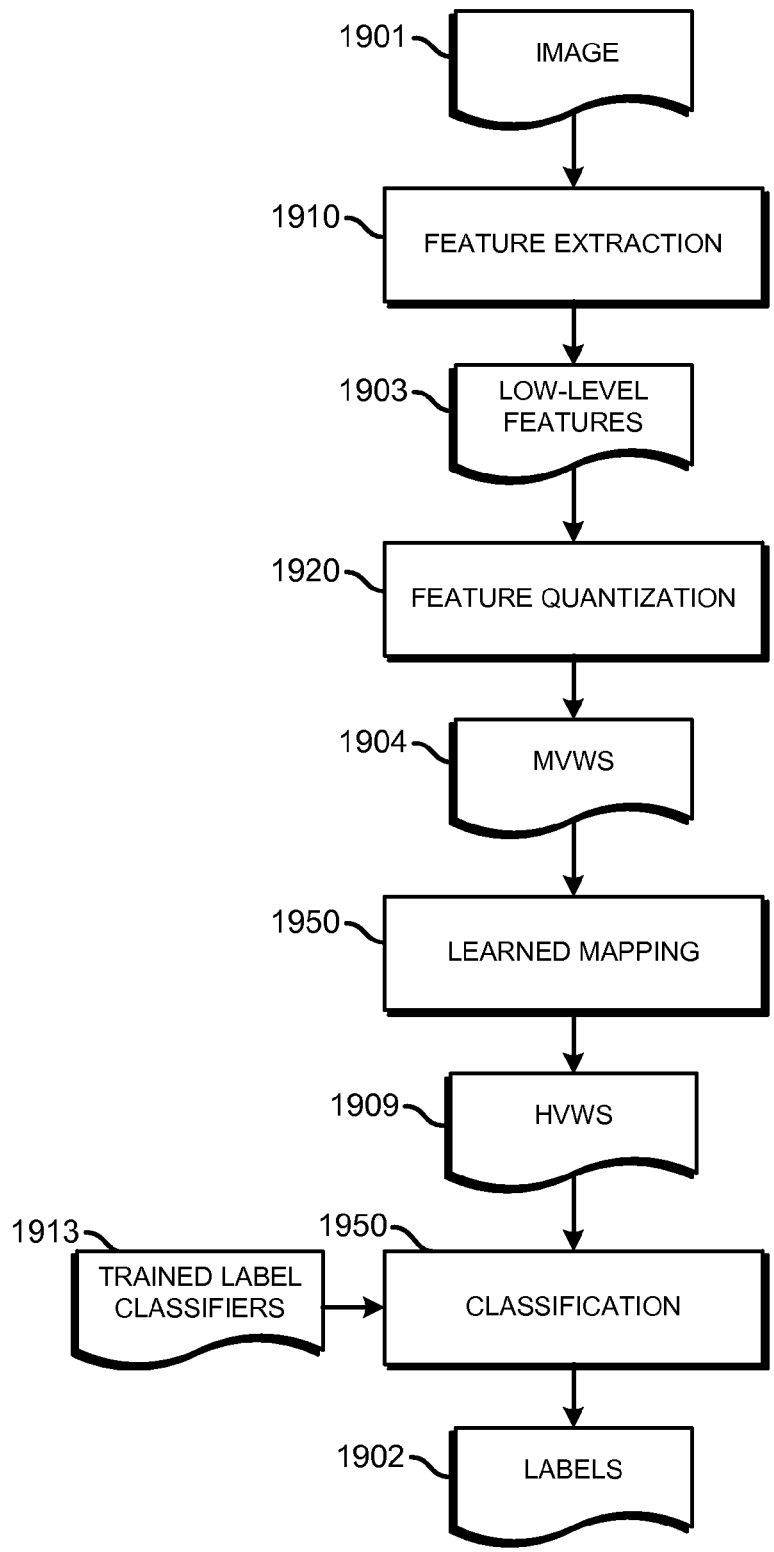
FIG. 19 illustrates an example embodiment of the flow of operations in a system for labeling images.

FIG. 19 illustrates an example embodiment of the flow of operations in a system for labeling images. An image 1901 is input to a feature-extraction module 1910, which extracts low-level features 1903 from the image 1901. The low-level features 1903 are input to a feature-quantization module 1920, which generates MVWs 1904 based on the low-level features 1903. The MVWs 1904 are obtained by a learned-mapping module 1950, which maps the MVWs 1904 to HVWs 1909, for example by using a map that determines the clusters in the vector space to which the MVWs belong. The HVWs 1909 are obtained by a classification module 1950, which determines the labels 1902 for the image 1901 based on the HVWs 1909 that are associated with the image 1901 and on trained label classifiers 1913. Any number of classifiers could be used, such as SVM, decision trees, neural networks, k-nearest neighbors, etc.

Figure 20:
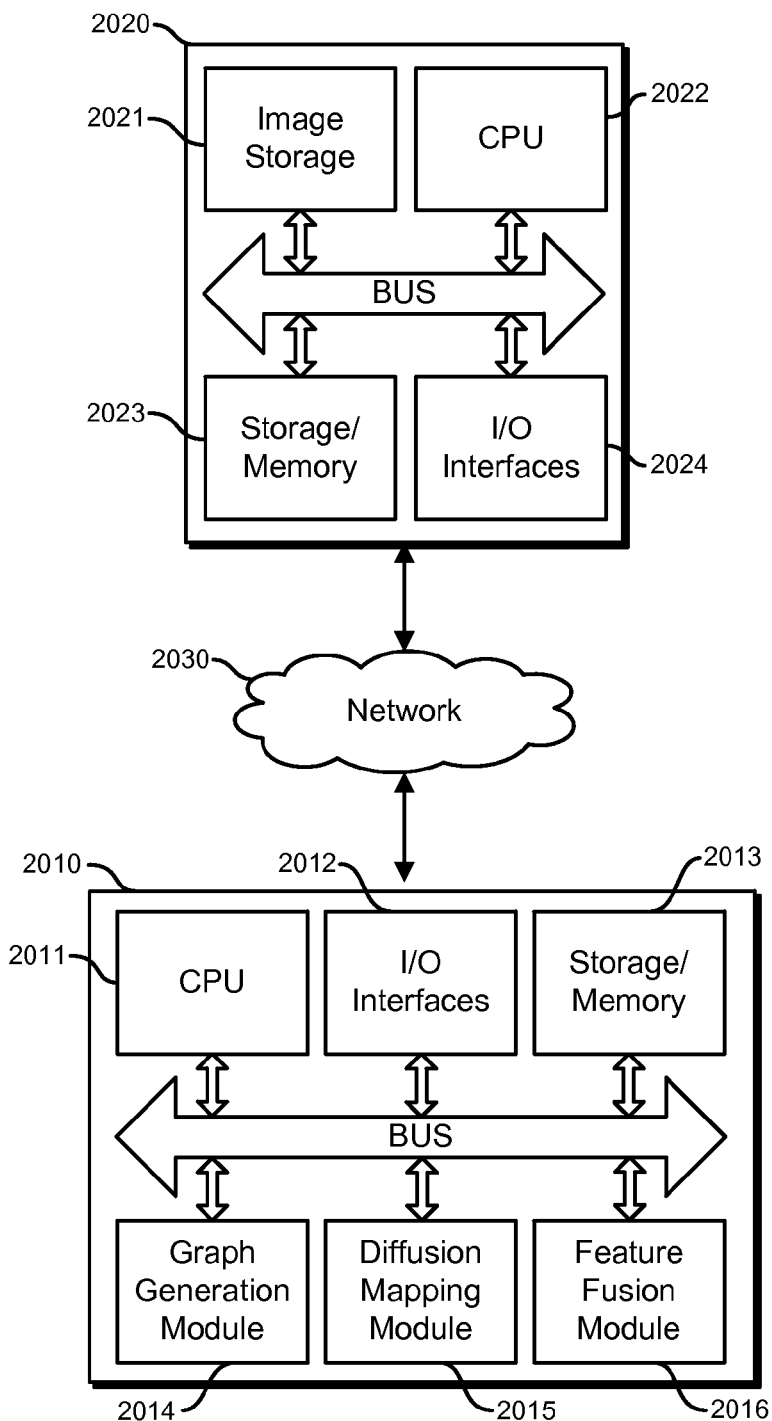
FIG. 20 illustrates an example embodiment of a feature fusion system.

FIG. 20 illustrates an example embodiment of a feature-fusion system. The system includes a feature-fusion device 2010 and an image storage device 2020. The feature-fusion device 2010 includes one or more processors (CPU) 2011, I/O interfaces 2012, and storage/memory 2013. The CPU 2011 includes one or more central processing units (e.g., microprocessors, single core processors, multi-core processors) and is configured to read and perform computer-executable instructions, such as instructions stored in the modules. The computer-executable instructions may include those for the performance of the methods described herein. The I/O interfaces 2012 provide communication interfaces to input and output devices, which may include a keyboard, a display, a mouse, a printing device, a touch screen, a light pen, an optical storage device, a scanner, a microphone, a camera, a drive, and a network (either wired or wireless).

The storage/memory 2013 includes one or more computer readable or writable media, and may include, for example, a magnetic disk (e.g., a floppy disk, a hard disk), an optical disc (e.g., a CD, a DVD, a Blu-ray), a magneto-optical disk, a magnetic tape, semiconductor memory (e.g., a non-volatile memory card, flash memory, a solid state drive, SRAM, DRAM), an EPROM, an EEPROM, etc. The storage/memory 2013 is configured to store computer-readable information or computer-executable instructions, including MVWs, HVWs, relationship representations, and classifiers. The components of the feature-fusion device 2010 communicate via a bus.

The feature fusion device 2010 also includes a graph-generation module 2014, a diffusion-mapping module 2015, and a feature-fusion module 2016. In some embodiments, the feature fusion device 2010 includes additional or fewer modules, the modules are combined into fewer modules, or the modules are divided into more modules. The graph-generation module 2014 includes instructions that, when executed by the feature-fusion device 2010, cause the feature-fusion device 2010 to receive one or more images (e.g., from the image storage device 2020), extract low-level features from the one or more images, generate MVWs based on the low-level features, and generate a graph or other relationship representation based on one or more of the following: the MVWs, the images, any labels, and other objects. The diffusion-mapping module 2015 includes instructions that, when executed by the feature-fusion device 2010, cause the feature-fusion device 2010 to map the MVWs to a vector space based on a relationship representation (e.g., a graph, a weight matrix). The feature-fusion module 2016 includes instructions that, when executed by the feature-fusion device 2010, cause the feature-fusion device 2010 to generate HVWs in the vector space and train one or more respective classifiers for the HVWs.

The image-storage device 2020 includes a CPU 2022, storage/memory 2023, I/O interfaces 2024, and image storage 2021. The image storage 2021 includes one or more computer-readable media that are configured to store images or image features. The image-storage device 2020 and the feature-fusion device 2010 communicate via a network 2030.

Figure 21A:
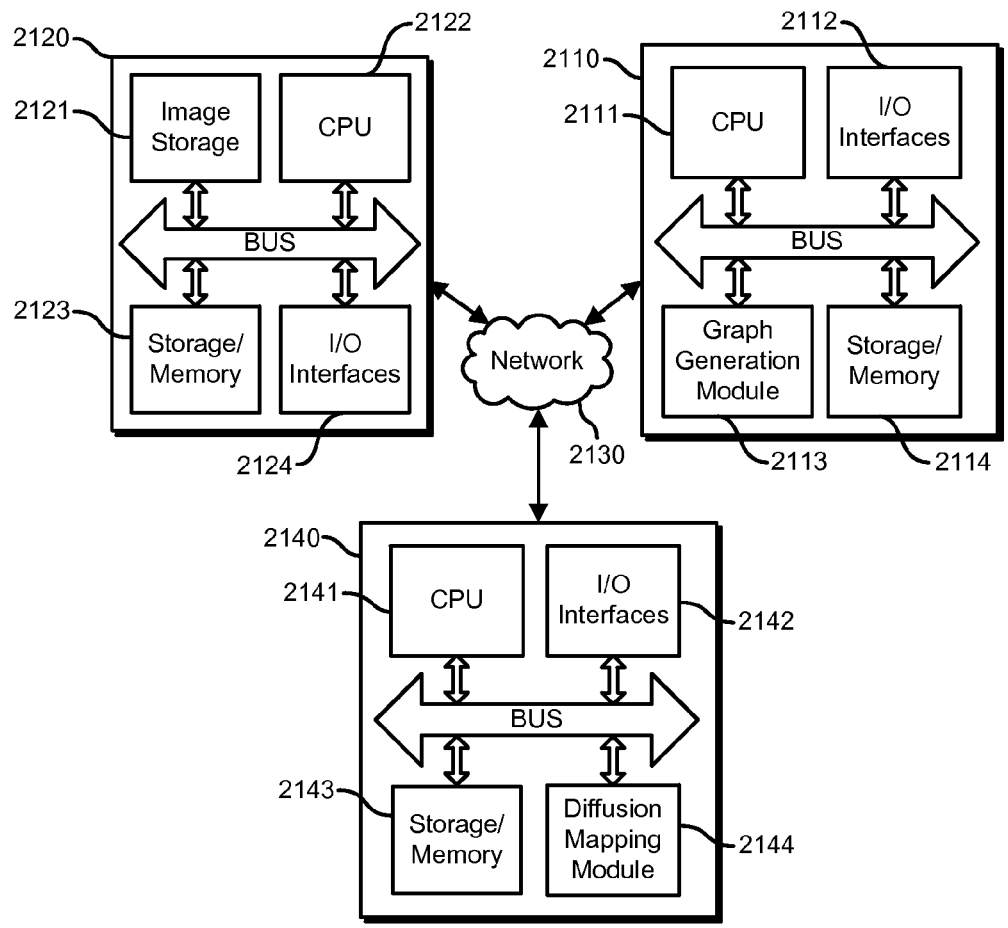
FIG. 21A illustrates an example embodiment of a feature fusion system.

FIG. 21A illustrates an example embodiment a feature-fusion system. The system includes an image storage device 2120, a relationship-modeling device 2110, and a diffusion-mapping device 2140, which communicate via a network 2130. The image storage device 2120 includes one or more CPUs 2122, I/O interfaces 2124, storage/memory 2123, and image storage 2121. The relationship-modeling device 2110 includes one or more CPUs 2111, I/O interfaces 2112, storage/memory 2114, and a graph-generation module 2113. The diffusion-mapping device includes one or more CPUs 2141, I/O interfaces 2142, storage/memory 2143, and a diffusion-mapping module 2144.

Figure 21B:
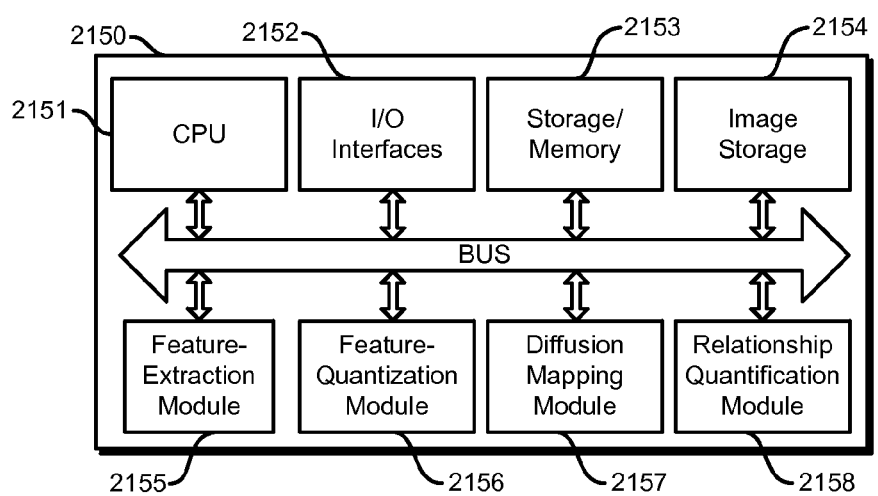
FIG. 21B illustrates an example embodiment of a feature fusion system.

FIG. 21B illustrates an example embodiment a feature-fusion system. The system includes a feature-fusion device 2150. The feature-fusion device 2150 includes one or more CPUs 2151, I/O interfaces 2152, storage/memory 2153, an image storage module 2154, a feature-extraction module 2155, a feature-quantization module 2156, a diffusion-mapping module 2157, and a relationship-quantification module 2158. Thus, this example embodiment of the feature-fusion device 2150 performs all the operations and stores all the applicable information (e.g., low-level features, MVWs, images, labels, classifiers, HVWs, relationships models, codebooks) on a single device.

The above described devices, systems, and methods can be implemented by supplying one or more computer-readable media having stored thereon computer-executable instructions for realizing the above described operations to one or more computing devices that are configured to read the computer-executable instructions and execute them. In this case, the systems and/or devices perform the operations of the above-described embodiments when executing the computer-executable instructions. Also, an operating system on the one or more systems and/or devices may implement the operations of the above described embodiments. Thus, the computer-executable instructions and/or the one or more computer-readable media storing the computer-executable instructions thereon constitute an embodiment.

Any applicable computer-readable medium (e.g., a magnetic disk (including a floppy disk, a hard disk), an optical disc (including a CD, a DVD, a Blu-ray disc), a magneto-optical disk, a magnetic tape, and a solid state memory (including flash memory, DRAM, SRAM, a solid state drive)) can be employed as a computer-readable medium for the computer-executable instructions. The computer-executable instructions may be written to a computer-readable medium provided on a function-extension board inserted into the device or on a function-extension unit connected to the device, and a CPU provided on the function-extension board or unit may implement the operations of the above-described embodiments.

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:
1. A method comprising:
defining initial inter-visual word relationships between a plurality of visual words that were generated based on visual features;
defining visual word-image relationships between the plurality of visual words and a plurality of images;

defining inter-image relationships between the plurality of images;
generating revised inter-visual word relationships in a vector space based on the initial inter-visual word relationships, the inter-image relationships, and the visual word-image relationships, wherein generating the revised inter-visual word relationships in the vector space based on the initial inter-visual word relationships, the inter-image relationships, and the visual word-image relationships includes
generating a diffusion map that represents the initial inter-visual word relationships, the inter-image relationships, and the visual word-image relationships, wherein the diffusion map includes nodes,
wherein the nodes represents a respective visual word or a respective image, and
wherein a diffusion distance between two nodes in the diffusion map is based on a likelihood that a Markov chain transits from each of the two nodes to a same node by following any arbitrary path that has a length of a given number of transition steps; and
generating higher-level visual words in the vector space based on the revised inter-visual word relationships.

2. The method of claim 1, wherein generating the revised inter-visual word relationships includes generating a weight matrix based on the initial inter-visual word relationships, the visual word-image relationships, and the inter-image relationships.

3. The method of claim 1, wherein the initial inter-visual word relationships are based on a visual similarity of the respective visual words, and wherein the inter-image relationships are based on a visual similarity of the respective images.

4. The method of claim 1, wherein the visual word-image relationships are based on co-occurrences of respective visual words and images.

5. The method of claim 1, wherein generating the revised inter-visual word relationships in the vector space based on the initial inter-visual word relationships, the inter-image relationships, and the visual word-image relationships includes mapping the initial inter-visual word relationships, the inter-image relationships, and the visual word-image relationships to the vector space.

6. The method of claim 5, wherein the revised inter-visual word relationships in the vector space are based on respective Euclidian distances in the vector space.

7. The method of claim 6, further comprising generating clusters of visual words in the vector space based on the revised inter-visual word relationships, wherein the higher-level visual words are generated based on the clusters of visual words.

8. The method of claim 1, further comprising:
defining semantic label-visual word relationships between a plurality of semantic labels and the plurality of visual words; and
defining inter-semantic label relationships between the semantic labels,
wherein the revised inter-visual word relationships in the vector space are generated further based on the semantic label-visual word relationships and the inter-semantic label relationships.

9. The method of claim 8, wherein the inter-semantic label relationships are defined according to a hierarchy.

10. The method of claim 1, wherein the visual words were generated in a native visual-feature space of the visual features, and wherein a visual word encompasses a space in the native visual-feature space.

11. The method of claim 10, wherein a higher-level visual word includes a group of two or more visual words.

12. The method of claim 1, wherein the diffusion distance is calculated according to $$[D^{(t)}(z_i, z_j)]^2 = \sum_{q \in Z} \frac{(p_{iq}^{(t)} - p_{jq}^{(t)})^2}{\varphi(z_q)^{(0)}},$$

where $D^{(t)}(z_i,z_j)$ is the diffusion distance; where $z_i$, $z_j$, and $z_q$ are nodes in the diffusion map; where $p_{iq}^{(t)}$ and $p_{jq}^{(t)}$ are random-walk forward probabilities; and where $\phi(z_q)^{(0)}$ is a stationary distribution that indicates a density of the visual words.

13. The method of claim 1, wherein the diffusion distance is calculated according to $$[D^{(t)}(z_i, z_j)]^2 \approx \sum_{s=2}^{d+1} (\lambda_s^t)^2 (\varphi_s(z_i) - \varphi_s(z_j))^2,$$

where $D^{(t)}(z_i,z_j)$ is the diffusion distance, where $z_i$ and $z_j$ are nodes in the diffusion map, where $\phi_s(z_i)$ and $\phi_s(z_j)$ are eigenvectors of a transition matrix, and where $\lambda_s^t$ is an eigenvalue.

14. The method of claim 1, wherein some visual words in the plurality of visual words are a first type of visual word, which are visual words that were generated based on visual features that are a first type of visual feature, and wherein some visual words in the plurality of visual words are a second type of visual word, which are visual words that were generated based on visual features that are a second type of visual feature, and
wherein the visual words that are the first type of visual word have a different native visual-feature space than the visual words that are the second type of visual word.

15. The method of claim 14, wherein the initial inter-visual word relationships, the inter-image relationships, and the visual word-image relationships can be represented by a weight matrix W, wherein $$W = \begin{pmatrix} II & AI^T & SI^T \\ AI & AA & AS^T \\ SI & AS & SS \end{pmatrix},$$

where II denotes inter-image relationships, where AA denotes the inter-visual word relationships of the visual words that are the first type of visual word, where SS denotes the inter-visual word relationships of the visual words that are the second type of visual word, where AI denotes the visual word-image relationships of the images and of the visual words that are the first type of visual word, where SI denotes the visual word-image relationships of the images and of the visual words that are the second type of visual word, and where AS denotes the inter-visual word relationships of the visual words that are the first type of visual word and the visual words that are the second type of visual word.

16. A method comprising:
defining initial inter-visual word relationships between a plurality of visual words that were generated based on visual features;

defining semantic label-visual word relationships between a plurality of semantic labels and the plurality of visual words;

defining inter-semantic label relationships between the plurality of semantic labels;

generating revised inter-visual word relationships in a vector space based on the initial inter-visual word relationships, the semantic label-visual word relationships, and the inter-semantic label relationships, wherein generating the revised inter-visual word relationships in the vector space based on the initial inter-visual word relationships, the semantic label-visual word relationships, and the inter-semantic label relationships includes generating a diffusion map that represents the initial inter-visual word relationships, the semantic label-visual word relationships, and the inter-semantic label relationships, wherein the diffusion map includes nodes, wherein the nodes represents a respective visual word or a respective semantic label, and wherein a diffusion distance between two nodes in the diffusion map is based on a likelihood that a Markov chain transits from each of the two nodes to a same node by following any arbitrary path that has a length of a given number of transition steps; and generating higher-level visual words in the vector space based on the revised inter-visual word relationships.

17. The method of claim 16, further comprising:

defining visual word-image relationships between the plurality of visual words and the plurality of images, wherein the revised inter-visual word relationships in the vector space are generated further based on the visual word-image relationships.

18. One or more non-transitory computer-readable media storing instructions that, when executed by one or more computing devices, cause the one or more computing devices to perform operations comprising:

defining initial inter-visual word relationships between a plurality of visual words that were generated based on visual features;

defining semantic label-visual word relationships between a plurality of semantic labels and the plurality of visual words;

defining inter-semantic label relationships between the plurality of semantic labels;

generating revised inter-visual word relationships in a vector space based on the initial inter-visual word relationships, the semantic label-visual word relationships, and the inter-semantic label relationships, wherein generating the revised inter-visual word relationships in the vector space based on the initial inter-visual word relationships, the semantic label-visual word relationships, and the inter-semantic label relationships includes generating a diffusion map that represents the initial inter-visual word relationships, the semantic label-visual word relationships, and the inter-semantic label relationships, wherein the diffusion map includes nodes, wherein each of the nodes represents a respective visual word or a respective semantic label, and wherein a diffusion distance between two nodes in the diffusion map is based on a likelihood that a Markov chain transits from each of the two nodes to a same node by following any arbitrary path that has a length of a given number of transition steps; and generating higher-level visual words in the vector space based on the revised inter-visual word relationships.

19. A system comprising:

one or more computer-readable media configured to store features; and one or more processors that are coupled to the one or more computer-readable media and that are configured to cause the system to define initial inter-visual word relationships between a plurality of visual words that were generated based on visual features, define visual word-image relationships between the plurality of visual words and a plurality of images, define inter-image relationships between the plurality of images, generate revised inter-visual word relationships in a vector space based on the initial inter-visual word relationships, the visual word-image relationships, and the inter-image relationships, wherein, to generate the revised inter-visual word relationships in the vector space, the one or more processors are configured to cause the system to generate a diffusion map that represents the initial inter-visual word relationships, the inter-image relationships, and the visual word-image relationships, wherein the diffusion map includes nodes, wherein the nodes represents a respective visual word or a respective image, and wherein a diffusion distance between two nodes in the diffusion map is based on a likelihood that a Markov chain transits from each of the two nodes to a same node by following any arbitrary path that has a length of a given number of transition steps, and generate higher-level visual words in the vector space based on the revised inter-visual word relationships.

* * * * *